United States Patent
Agassi et al.

(10) Patent No.: US 7,711,607 B2
(45) Date of Patent: May 4, 2010

(54) METHOD AND SYSTEM FOR DEPLOYING A BUSINESS APPLICATION

(75) Inventors: Shai Agassi, Los Gatos, CA (US); Udi Ziv, Raanana (IL); Gadi Shamia, Los Altos, CA (US); Hila Mazinter, Palo Alto, CA (US)

(73) Assignee: SAP AG, Walldorf (DE)

( * ) Notice: Subject to any disclaimer, the term of this patent is extended or adjusted under 35 U.S.C. 154(b) by 984 days.

(21) Appl. No.: 11/323,095

(22) Filed: Dec. 30, 2005

(65) Prior Publication Data
US 2007/0162501 A1 Jul. 12, 2007

(51) Int. Cl.
*G06Q 30/00* (2006.01)
(52) U.S. Cl. .......................................... 705/26; 705/7
(58) Field of Classification Search .............. 705/7, 705/14, 26; 707/3, 104.1
See application file for complete search history.

(56) References Cited

U.S. PATENT DOCUMENTS

| | | | |
|---|---|---|---|
| 5,758,328 A * | 5/1998 | Giovannoli | 705/26 |
| 5,842,178 A * | 11/1998 | Giovannoli | 705/26 |
| 5,948,061 A | 9/1999 | Merriman et al. | |
| 6,240,420 B1 | 5/2001 | Lee | |
| 6,285,987 B1 | 9/2001 | Roth et al. | |
| 6,441,834 B1 | 8/2002 | Agassi et al. | |
| 6,480,842 B1 | 11/2002 | Agassi et al. | |
| 6,502,094 B1 | 12/2002 | Gvily et al. | |
| 6,775,674 B1 | 8/2004 | Agassi et al. | |
| 7,006,980 B1 * | 2/2006 | Snyder | 705/10 |
| 7,127,473 B2 | 10/2006 | Agassi et al. | |
| 7,200,801 B2 | 4/2007 | Agassi et al. | |
| 7,401,025 B1 * | 7/2008 | Lokitz | 705/1 |
| 2001/0049658 A1 | 12/2001 | Hays | |
| 2001/0049720 A1 | 12/2001 | Eyer | |
| 2002/0123912 A1 * | 9/2002 | Subramanian et al. | 705/5 |
| 2003/0097308 A1 * | 5/2003 | Connors et al. | 705/26 |
| 2004/0198331 A1 | 10/2004 | Coward et al. | |
| 2004/0254884 A1 | 12/2004 | Haber et al. | |
| 2005/0288945 A1 | 12/2005 | Melamed et al. | |
| 2009/0254421 A1 * | 10/2009 | Wolfe | 705/10 |

FOREIGN PATENT DOCUMENTS

EP 1077418 A2 * 2/2001

OTHER PUBLICATIONS

Anon., "QuickQuote, New Matching Service for Buyers and Sellers of Small Business Products and Services, Debuts at inc.com," Business Wire, Aug. 8, 2000.*
"With 'Free' Lure, Will Google Tap More Markets?", *The Wall Street Journal*, [online], <http://online.wsj.com/public/article_print/SB112898700635064956->, retrieved Jun. 4, 2007, 4 pages.
"Intuit and Google Force Allliance," Google™ Press Center, [online], <http://www.google.com/intl/en/press/pressrel/google_intuit.html>, retrieved Jun. 4, 2007, 4 pages.

* cited by examiner

*Primary Examiner*—Nicholas D Rosen
(74) *Attorney, Agent, or Firm*—Fish & Richardson P.C.

(57) ABSTRACT

Methods and systems for deploying business applications are provided. A method for deploying a business application includes receiving inputted configuration information for the business application from a user of the business application. Additional configuration information is retrieved for the business application based on the inputted configuration information. The business application is configured based on the inputted and additional configuration information.

20 Claims, 15 Drawing Sheets

FIG. 5C   136c

4 Step Registration

| ✓ 1 | |
|---|---|
| 2 | Sign In Information<br>Account password (with verification re-entry), password hint, and personal identification information (birthplace, mother's maiden name, name of first pet)   Done |
| 3 | |
| 4 | |

FIG. 5D   136d

4 Step Registration

| ✓ 1 | |
|---|---|
| ✓ 2 | |
| 3 | Business Information<br>Official business name, public business name, business phone number, and business address   Done |
| 4 | |

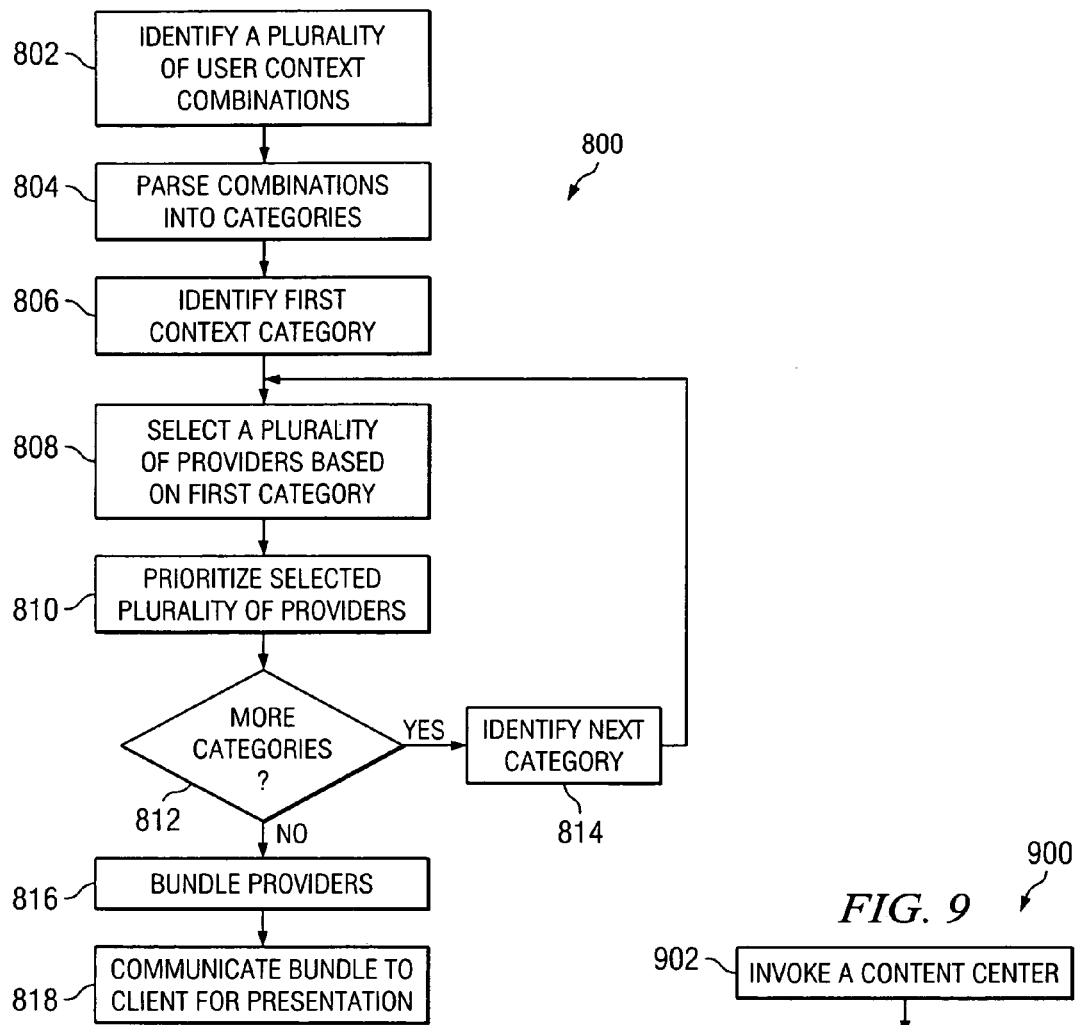
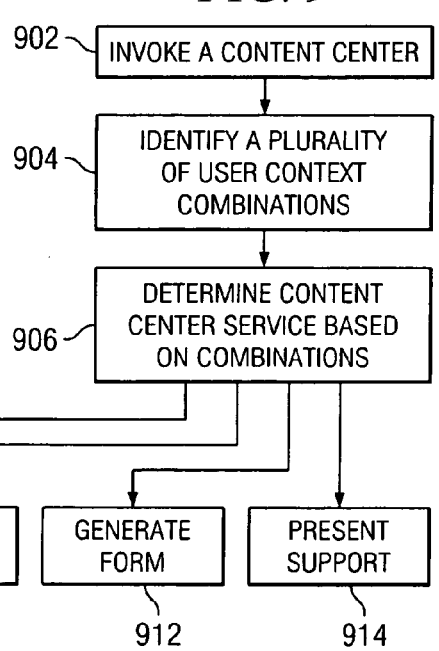

METHOD AND SYSTEM FOR DEPLOYING A BUSINESS APPLICATION

TECHNICAL FIELD

This disclosure relates to computer systems and methods and, more particularly, to methods and systems for deploying business applications.

BACKGROUND

In computer and data processing systems, user interaction is typically provided using a video display, a keyboard, and a mouse. The display is often presented through a graphical user interface (GUI). Such GUIs may provide the front-end for modules, applications, services, databases, or other local or remote processes. For example, the GUI may present data retrieved from a database in a user friendly form. In another example, the GUI may provide a front-end for an application with embedded customer relationship management (CRM), finance, and manufacturing capabilities. In such a case, this GUI may then provide a unified view of operations across CRM, manufacturing, and finance sub-systems or sub-modules. The user may through the GUI perform CRM, finance, manufacturing and other business processes with the application.

SUMMARY

The disclosure provides various embodiments of systems and methods for context-based deployment of business and/or other suitable applications. In one embodiment, a method for deploying a business application includes receiving inputted configuration information for the business application from a user of the business application. Additional configuration information is retrieved for the business application based on the inputted configuration information. The business application is configured based on the inputted and additional configuration information. In this and other embodiments, the inputted configuration information may, for example, be the location of the business, a class of the business, services of the business, customer channels for the business, supplier channels for the business, and/or other transaction partners.

In another aspect of the disclosure, service provider information may be provided to a business during deployment of a business application or otherwise. In one embodiment, a method for identifying service providers to a business includes identifying through a business application a business class of the business. Service providers for the business are identified based on the business class. The service providers are identified to the business. In this and other embodiments, the business application may be configured to permit a user of the business application to contact, transact with or otherwise engage the service providers through the business application.

Each of the foregoing—as well as other disclosed—example methods may be computer implementable. Moreover some or all of these aspects may be further included in respective systems and software for context-based deployment of business applications. For example, a system for deploying a business application may receive inputted configuration information for the business application from a user of the business application. Additional configuration information is retrieved by the system for the business application based on the inputted configuration information. The business application is then configured based on the inputted and additional configuration information.

In specific embodiments, computerized methods and systems for deploying a computer application for performing business process tasks includes receiving inputted configuration information for the computer application from a user of the application. Additional configuration information is received for the application based on the inputted configuration information. The application is configured based on the inputted and additional configuration information. In other specific embodiments, computerized methods and systems for identifying service resources include identifying through a computer application a class of a user, which may be an entity. Service resources are identified for the user based on the class. Information associated with the service resources are provided to the user. In still other specific embodiments, computerized methods and systems for deploying a computer application include retrieving information identifying a class of a user based on information input for the computer application. The user may be an entity and the computer application an application for performing business processes. Standardized configuration information may be retrieved for the application based on the class. The business application may be configured based on the standardized configuration information.

The method and system also includes client-side methods and systems for providing the described features, elements and functionality in connection with a remotely-hosted or other server-side application. For this aspect, the client-side methods and systems, such as a GUI or other client display, may receive the indicated content or other data items which may be selected or provided based on context or as otherwise indicated and may display, present or otherwise use the content and data items.

The details of these and other aspects and embodiments of the disclosure are set forth in the accompanying drawings and the description below. Features, objects, and advantages of the various embodiments will be apparent from the description and drawings, and from the claims.

DESCRIPTION OF DRAWINGS

FIGS. 5A-E illustrate example graphical user interfaces (GUIs) for user registration as implemented by the application described in FIG. 2;

FIG. 8 is a flowchart illustrating an example method for providing dynamic contact pages based on user context;

FIG. 9 is a flowchart illustrating an example method involving the content center described in FIG. 2;

DETAILED DESCRIPTION

Figure 1:
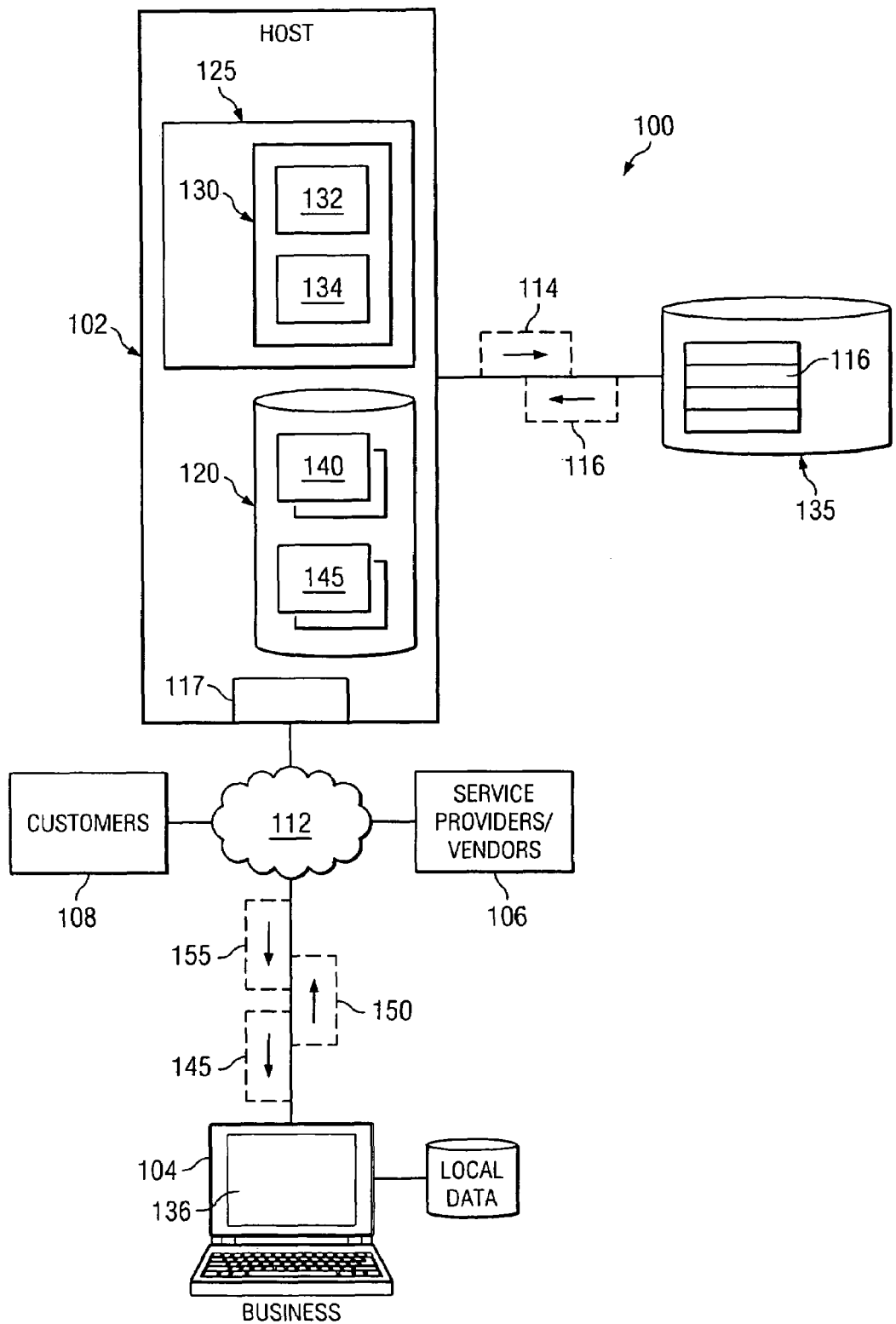
FIG. 1 illustrates an example system for processing user context in accordance with one embodiment of the present disclosure.

FIG. 1 illustrates an example system 100 for presenting or otherwise providing context based content for users of a computer application. "Business context" and "user context" are typically used interchangeably herein to describe some information collected, known, stored, determined, received, or otherwise identified by some component of system 100 to be associated with a user's role in a business, the user's business, a business application or process, and/or business activity of the user, business, or process or data involved therein. Generally, system 100 uses this business or user context to host, reference, or otherwise implement a contextual solution 130 to enable vendors or other service providers 106 to provide products and other services to businesses 104, or their individual users, as well as other companies in the network. This contextual solution 130 may, among other things, provide an advertising tool that will enable an advertiser to advertise using some or all of the following example user context parameters: company profile, user profile, user history, business process step, application user interface, application data, as well as user actions. For example, that advertiser can advertise through solution 130 to business 104 in the New York area in the textile business (company profile), where the user is between 30 and 40 years old (user profile), and is executing the sales business process (business process oriented) in the invoice screen (a step or interface in the business process) if he plans to ship to San-Francisco (application data).

Referring to illustrated FIG. 1, the contextual solution 130 is a hosted solution on a remote server 102 providing various business processes and functionality to business 104. Accordingly, system 100 may implement a suite of tightly integrated products that provide a contextual solution to offer advertisers and other sponsored content providers a wide range of product offerings or other secondary content, from personalized advertising through contextual text ads to creative advertisements based on the business context or other primary content. Returning to the example, business 104 may create an invoice based on a purchase by a customer 108. In this example, system 100 may provide targeted advertising to assist the business 104 in selecting a shipping company. If the example customer 108 doesn't pay the business, then system 100 may provide secondary content to the business user involving debt collection services or specialty finance companies that provide working capital financing. In another example, the customer 108 of business 104 may request a quote or proposal. System 100 may provide business 104 with secondary content aimed at increasing the sales books/courses and tips. If the business user selects items in response to this quote request, then system 100 may automatically compare prices, check price and terms of item by other merchants to give a better offer, and/or offer accessories and alternative items. To enhance this secondary content, system 100 may also monitor how many people click on each of the ads and note what each user does at the particular website, user's pattern of behavior thereby potentially refining context and the relevance (and placement) of each of the ads. Moreover, system 100 may increase its ability to place relevant ads in front of the user using behavioral targeting. Such behavioral processing may track what a user clicks on and looks at across a range of sites over the course of weeks and months, and build a detailed profile of that user's interests, purchases, and preferences.

System 100 is typically a distributed client/server system that spans one or more networks such as 112. As described above, rather being delivered as packaged software, system 100 may represent a hosted solution, often for an enterprise or other small business, that may scale cost-effectively and help drive faster adoption. In this case, portions of the hosted solution may be developed by a first entity, while other components are developed by a second entity. These entities may participate in any suitable form of revenue or cost sharing as appropriate. Moreover, the processes or activities of the hosted solution may be distribution amongst these entities and their respective components. For example, system 100 may implement an advertising-supported business model for software distribution. Such a model may provide a platform that leverages web-technologies to enable delivery of products and services to users. This model may further measure advertisement efficiency by tracking the user responsiveness or activity. Accordingly, it may enable third-party service providers to offer their services at the business object level through a seamless user-experience. In another example, system 100 may implement a component-based architecture and strong platform helps engage service providers to develop targeted solutions for sub-verticals or others types of markets. This implementation may emphasize features that helps benefit businesses that sell via online stores, thereby leveraging strategic relationships to bring the product to market. In such embodiments, data may be communicated or stored in an encrypted format such as, for example, using the standard TNG encryption algorithm. This encrypted communication may be between the user and the host or amongst various components of the host. Further, system 100 may store data (user, transaction, service provider, and such) at a relatively central location (over WAN), while concurrently maintain local data at the user's site for redundancy and to allow processing during downtime. But system 100 may be in a dedicated enterprise environment—across a local area network (over LAN) or subnet—or any other suitable environment without departing from the scope of this disclosure.

Figure 2:
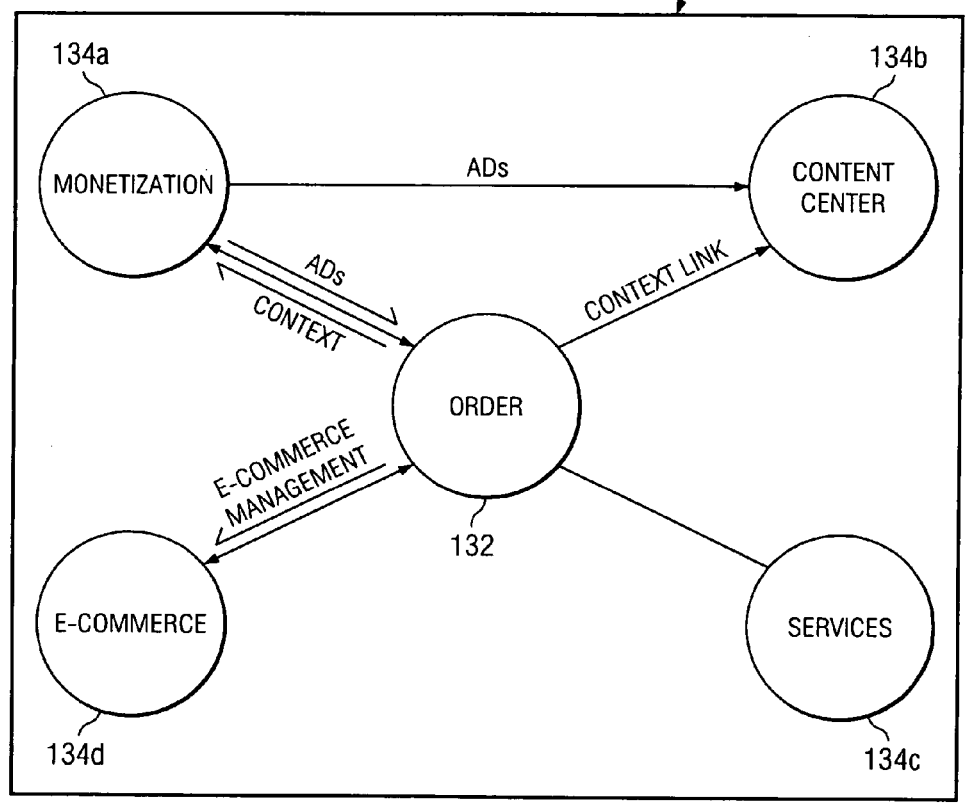
FIG. 2 illustrates an example hosting infrastructure implementing various processes and modules in accordance with one embodiment of the system of FIG. 1.

Turning to the illustrated embodiment, system 100 includes or is communicably coupled with server 102, one or more clients 104, one or more service providers or vendors 106, one or more customers 108, at least some of which communicating across network 112. Server 102 comprises an electronic computing device operable to receive, transmit, process and store data associated with system 100. Generally, FIG. 2 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. As illustrated, server 102 is communicably coupled with a remote repository 135 over a portion of network 112. Repository 135 is any intra-enterprise, inter-enterprise, regional, nationwide, or substantially national electronic storage facility, data processing center, or archive that allows for one or a plurality of clients 104 (as well as servers 102) to dynamically store and retrieve data elements 116, which may include any business, enterprise, application or other transaction data and metadata. Each data element 116 includes some form of transaction data and, perhaps, other related data such as foreign keys. Repository 135 may be a central database communicably coupled with one or more servers 102 and clients 104 via a virtual private network (VPN), SSH (Secure Shell) tunnel, or other secure network connection. Repository 135 may be physically or logically located at any appropriate location including in one of the example enterprises or off-shore, so long as it remains operable to store information associated with system 100 and communicate such data to at least a subset of plurality of clients 104 (perhaps via server 102). For example, repository 135 may comprise a data store or warehouse fairly local to application 130.

As a possible supplement to or as a portion of repository 135, illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes presentation elements 140 and user context profiles 145. But memory 120 may also include any other appropriate data such as VPN applications or services, firewall policies, a security or access log, print or other reporting files, HTML files or templates, data classes or object interfaces, child software applications or sub-systems, and others.

Illustrated presentation elements 140 include any parameters, pointers, variables, algorithms, instructions, rules, files, links, or other data for easily providing secondary content for any combination of user context and application data at any appropriate level of granularity. It will be understood that while user context may be described in terms of "combinations," such various user context data may be stored or processed using at least one data structure, object, record or file. Such presentation elements 140 may include (among other things) primary content, secondary content, and/or sponsored content. For example, each presentation element 140 may be a text element, a graphics element, a multimedia element, a network link to a second application, a network link to a remote module, an executable, or any other graphical or display element. In a more specific example, presentation element 140 may include or reference a publicly-available web page (or portion thereof), an internal e-mail, the user's personal contact information, weather information, a profit and loss report of a company, an OLAP (on-line analytical processing) report, portion of a sales order, as well as many others. In some embodiments, presentation elements 140 (or pointers thereto) may be stored in one or more tables in a relational database described in terms of SQL statements or scripts. In another embodiment, presentation elements 140 may be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. For example, a particular presentation element record may merely be a pointer to a third party advertisement stored remotely. In another example, a particular presentation element may be an internally stored advertisement for a tightly coupled service. In short, presentation elements 140 may comprise one table or file or a plurality of tables or files stored on one computer or across a plurality of computers in any appropriate format. Indeed, some or all of presentation elements 140 may be local or remote without departing from the scope of this disclosure and store any type of appropriate data.

Illustrated memory 120 further includes user context profiles 145. While not necessary, user context profile 145 may aid system 100 in identifying or determining the user context of the particular user. More specifically, user context profile 145 may include rules, algorithms, tables, or other instructions to identify certain user context elements—or individual datums or other information helping define or describe the user's context—such as a logical address such as an IP address or subnet, a physical location of the user, a user role, a department associated with the user, a particular company or enterprise, an industry associated with such a company or enterprise, a user identifier, a project, historical or current user actions, user preferences, or any other suitable contextual user element or contextual business element. For example, the user context profile 145 may help application 130 determine the role of the user based on the user's login ID. It should be understood that this disclosure contemplates the term "based on" to include "based, at least in part, on." In another example, the user context profile may help application 130 determine the industry or department of the particular user based on the subnet identifier of client 104, which may identify the enterprise of logical network including the user. In a further example, the user context profile 145 may provide a list of users and the expected or preferred types of presentation elements 140 as determined by the user context. Such a list may be customized by a network, database, or system administrator, as well as by the particular verified user. In this example, the user may login through a portal to customize his list of context elements to ensure that appropriate or more useful presentation elements 140 are displayed on his GUI 136 when he requests data. Moreover, server 102 may automatically determine the user's contextual information and store such information in a profile 145 for subsequent use. As with presentation elements 140, user context profiles 145 may be stored in any suitable format, such as an XML file or a SQL table, in one or more appropriate local or remote locations. For example, server 102 may store a plurality of records that are keyed off of the particular business 104, the respective user, and the context type or combination identifier. These example records would then include other information such as the business or user context combination, foreign keys, or other usable data.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes application 130.

At a high level, the application is operable to receive and/or process requests 150 from users and present at least a subset of the results to the particular user via an interface. More specifically, application 130 is any application, program, module, process, or other software that includes some context component 132 that is operable to identify the context of the user and that presents presentation elements 140 along with other data objects 155 though interface 136. In certain cases, system 100 may implement a composite application 130, as described above in FIG. 2. For example, application 130 may comprise a hosted business application 132 that is communicably coupled with a variety of other modules 134, each typically operable to provide some information, service, product, or reference to secondary content or service provider 106. In this manner, application 130 may offer advertisers a wide range of product offerings from personalized ads (text ads and banner ads) to contextual ads based on user and business context. Moreover, application 130 may monitor how many users or businesses select each of the ads and then record what each person does at the website, thereby helping refine context and the relevance (and placement) of each of the ads while weeding out the less effective efforts.

Regardless of the particular implementation, "software" may include software, firmware, wired or programmed hardware, or any combination thereof as appropriate. Indeed, application 130 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 130 is illustrated in FIG. 2 as including a number of sub-modules, business application 132 and third party modules 134 respectively, application 130 may include numerous other sub-modules (as in FIG. 2) or may instead be a single multi-tasked module that implements the various features and functionality through various objects, methods, or other processes. Further, while illustrated as internal to server 102, one or more processes associated with application 130 may be stored, referenced, or executed remotely. For example, a portion of application 130 may be a web service that is remotely called, while another portion of application 130 may be an interface object bundled for processing at remote client 104. In another example, the majority of processes or modules may reside—or processing take place—on client 104. Moreover, application 130 may be a child or sub-module of another software module or enterprise application (not illustrated) without departing from the scope of this disclosure.

Server 102 may also include interface 117 for communicating with other computer systems, such as clients 104, over network 112 in a client-server or other distributed environment. In certain embodiments, server 102 receives data from internal or external senders through interface 117 for storage in memory 120, for storage in DB 135, and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. For example, server 102 may be communicably coupled to repository 135 through one sub-net while communicably coupled to a particular client 104 through another. In another example, some vendors 106 or customers 108 may represent local vendors 106 or "walk-in" customers 108, respectively, that physically interact with business 104 without use of network 112. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 104.

Client 104 is any computing device operable to connect or communicate with server 102 or network 112 using any communication link. At a high level, each client 104 includes or executes at least GUI 136 and comprises an electronic computing device operable to receive, transmit, process and store any appropriate data associated with system 100. It will be understood that there may be any number of clients 104 communicably coupled to server 102. Further, "client 104," "business," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. In certain situations, users may include owners, bookkeepers, as well as third party or outside accountants. For the business owner, system 100 may provide or make available, for example, through client 104 and application 130: i) business status information (seven-day profit & loss report, daily bank statement); ii) customer information (contact information, recent purchases, payment history, credit re-port); and iii) product information (inventory levels, vendor information, unit cost). In another example, bookkeepers typically do invoicing, bill paying, payroll (whether directly or preparing data for a payroll service), and general banking. For this bookkeeper, system 100 may provide or make available, for example, through client 104 and application 130: i) transaction documentation (purchase orders, invoices); accounting basics (chart of accounts, accounts receivable, accounts payable, tax preparation); iii) human resources information (employee information, benefits tracking); and iv) banking activities (monthly statement reconciliation, business checking, business credit card transactions, customer credit card transactions). For outside accountants, system 100 may provide or make available, for example, through client 104 and application 130: i) a detailed, professional view of the business; ii) analytic tools to drill down to root causes of cash shortfalls or windfalls; iii) tools to project trends and test the effect of decisions; iv) sophisticated business reporting tools to summarize trends and status graphically for the owner; v) annotation tools so they can leave notes in the books for the bookkeeper and for their own future reference; vi) import and export from third party accounting or business software.

As used in this disclosure, business 104 is any person, department, organization, small business, enterprise, or any other entity that may use or request others to use system 100, namely application 130. For simplicity, business 104 may also be termed a client 104, which is intended to encompass a personal computer, touch screen terminal, workstation, network computer, kiosk, wireless data port, smart phone, personal data assistant (PDA), one or more processors within these or other devices, or any other suitable processing device used by or for the benefit of business 104. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

Figure 5A:
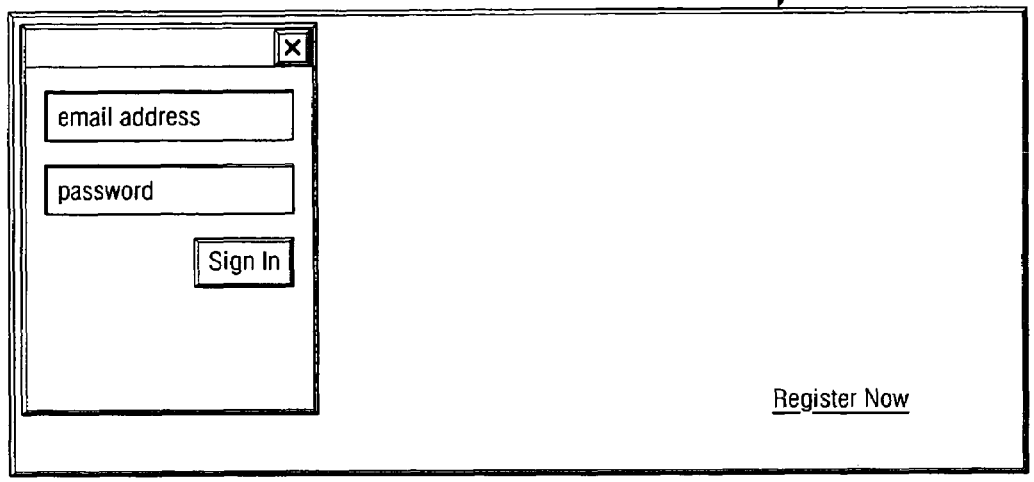
Figure 5B:
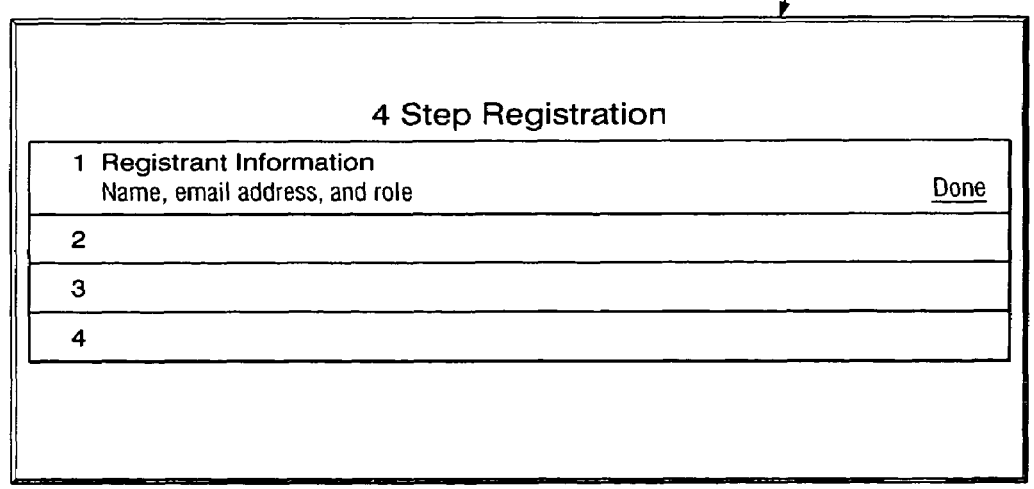

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. As shown in later figures, GUI 136 may comprise a plurality of customizable frames or views having interactive fields, pull-down lists, and buttons operated by the user. For example, GUI 136 is operable to display certain presentation elements 140 in a user-friendly form based on the user context and the displayed data. GUI 136 may also present a plurality of portals or dashboards. For example, GUI 136 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 136 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 136 may indicate a reference to the front-end or a component of application 130, as well as the particular interface accessible via client 104, as appropriate, without departing from the scope of this disclosure. Therefore, GUI 136 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112, such as those illustrated in FIGS. 5 and 7.

Server 102 may also be communicably coupled with a plurality of service providers or other vendors 106. As described above, these vendors 106 may be local or remote to business 104. Regardless of the location, server 102 includes some reference or partnership with these vendors 106 to offer advertisements or other secondary content involving their services to business 104, which are automatically determined or identified based on user context. Moreover, application 130 may allow the particular business 104 to generate or otherwise provide feedback to service providers 106 to help advertisers to re-brand or mold one or more of their services to better fit the needs of the users. Such services may include goods, services, consulting, or other similar offerings that may benefit business 104 in some way. In some cases, these services may be termed tightly coupled or loosely-coupled. Service provider 106 may offer tightly integrated services, which are generally services integrated into application 130. Such tight integration may offer seamless end-to-end business processes. These services may be monetized through transaction fees as a percentage of a transaction amount, flat fees, or any other agreed upon fee arrangement. Moreover, guaranteed advertising spending or minimum revenue share may be also offered. For example, some service providers 106 offering tightly-coupled services may include e-commerce providers, shippers, and payroll processors. These tightly coupled services may provide some or all of the following example functionality (as well as others not listed):

i) E-commerce: quickly and easily create a complete, secure online store. To achieve this, it may help create and manage an online storefront with customizable shopping cart and checkout pages, organize product information, and track inventory levels. Moreover, it may help business 104 list products on auction and shopping sites, process online payments with tools to prevent fraudulent transactions, manage orders in real time, and give customers online order status. Business 104 may use detailed product sales and performance reporting to help optimize online strategy;

ii) Shipping: may provide access to shipping with the market leading, local, or discount carriers. This service may provide a single interface to access these carriers with preferred rates and discounts, which may be dynamically kept up-to-date using web services or other similar technologies. The shipping service may help business 104 manage shipping activities more efficiently by storing recipients contact information, manage all shipping history and activity in one central location, as well as customize email notifications for shipments and shipment preferences.

iii) Payroll services: calculate paycheck and tax obligations for each employee, print and deliver checks or handle direct deposit, deliver management reports to the user's or another contact's inbox, offer automatic check signatures, handle W-2s, tie-in with 401(k) and Section 125 mutual fund plans potentially allowing employees to set up automatic deductions from their paychecks, and file state and federal payroll taxes for business 104.

Conversely, there are often a number of loosely-coupled on-demand services that are not embedded (or integrated) in application 130 and offered using a web services API. Using simple web technologies, server 102 may create an on-demand services platform to make it extremely easy for service providers 106 to offer their services and for users to buy them. Such providers 106 may pay a service fee or some percentage of revenues service providers generate on the platform. For example, some loosely coupled service providers 106 may include financial advisors, lead generators, data enhancers, inventory optimizers, human resources, warehouse outsourcing, IP telephony, debt collection, and business lifecycle management. In this example, the financial advisor may help establish financial goals and then meet or exceed them. This service provider 106 may compares the business 104's performance and spending to others of the similar size and type in twenty key dimensions. Further, such financial services may facilitate or provide:

forecasts of income, expenses, cash and debt;
recommendations for business improvement and growth;
accounts receivable management and debt collection;
inventory control and management;
recommendations for reducing costs; and/or
debt management and access to tailored loan packages.

The lead generation service may help business 104 by providing targeted leads from a database of, for example, more than 14 million businesses and 250 million consumers, perhaps compiled by a third party provider of business and consumer data. This service may allow users to define their own criteria to select leads based on geography, business size and type, or other demographic information.

Data enhancement generally improves at least a portion of the data used or owned by business 104—from hundreds to millions of records—by offering or using data cleansing and validation processes to keep information up-to-date and accurate. Such processes may include eliminating duplicates, correcting and updating addresses and area codes, adding industry information, and enhancing customer information with email addresses and phone numbers. Further, by adding new fields from a service provider's database to the business 104's list, unique selection criteria can be tailored to industry, campaign or business objectives. Inventory optimization may help manage inventory to optimal levels, reduce carrying and logistical costs, increase service levels, and improve asset utilization and inventory performance. Further, this service may offer a so-called "what if" analyzer demonstrating or presenting how changes in inventory and logistics system may affect costs, inventory levels, and delivery times. The example HR service may offer one or more solutions that increase productivity, ensure compliance, improve employee retention, find and manage temporary staff, and control costs. Such solution may include payroll, benefit management, 401 (k)/Retirement Services, expense management, and/or tax and compliance management.

Warehouse outsourcing generally offers the easiest way to quickly fulfill customer orders without managing inventory or, perhaps, even a warehouse. A top-tier logistics company will warehouse, inventory, pack, and ship products. Telephone, mail, and web orders can also be process. IP telephone service may dramatically reduce phone service costs of business 104. This service normally delivers local and long distance calling anywhere in the world for one low price. IP telephone generally uses existing high-speed Internet connection instead of standard phone lines. Business 104 may save money and receive features like caller ID with name, call waiting, a dedicated fax line, voicemail, teleconferencing, and web conferencing.

The example debt collection service is typically an efficient, cost-effective way to secure outstanding payments and recover bad debt. For example, this service may automatically generate letters, faxes, or emails and prompt the user for telephone calls are used to quickly settle the account. In another example, a flexible escalation process is tailored to users' preferences and can be adjusted for each individual customer. The business lifecycle management service may help manage the interface between business performance and personal wealth and income. This service may further offer optimized plans and what-if analysis for revenue recognition and strategic spending, reinvestment and retained earnings, personal compensation and retirement savings, as well as analyze the value of business 104 as an investment and determine its valuation.

The forgoing providers 106 should not be considered an exhaustive or limiting example. Moreover, the characterization of a particular provider 106's services as tightly-coupled or loosely-coupled is merely for example purposes only and is not meant to limit the scope of this disclosure.

FIG. 2 illustrates an example hosting infrastructure implementing various processes and modules in accordance with one embodiment of the system of FIG. 1. Of course, while described as a hosted solution, any similar internal or third party implementation may suffice and be within the scope this disclosure. Returning to the illustration, application 130 includes a business application 132, as well as a number of services or modules 134. In this example, business application 132 may be developed or owned by a first entity (even though potentially hosted by another), while some or all of the service modules 134 may be developed or owned by a secondary entity (who may also be the host). While described in more detail in FIG. 3, application 132 may be considered business software or solution that is capable of interacting or integrating with local and third party modules 134 to provide the user with context-based presentations, advertisements, competitive bidding, and other secondary content. More specifically, an example application 132 may be a computer application for performing any suitable business process by implementing or executing a plurality of steps. This example application 132 may leverage knowledge of the demographic information of the user obtained during a (perhaps optional) registration process (and further refined throughout usage of the application) to provide personalized ads. As a result, application 132 may initially provide personalized advertising using the known demographic information, but intelligently identify and determine contextuality to provide highly relevant and personalized, for example, contextual text (and banner) ads over time.

Monetization module 134a may help application 130 to provide business process oriented matching context. To achieve this, monetization module 134a may receive or request user context combinations from application 132, identify further user combinations based on past usage or advertisement success, or identify the user context using any other appropriate technique in order to, among other things, present advertising oriented to the particular process. Once the user context combinations are identified or received, then module 134a may define or calculate the matching vectors and their weights, sort the combinations based on a priority or timeline, or otherwise process the user context to attempt to optimize the user's experience and advertising revenue. These contextual ads may include various categories such as textual ads and branded ads. In this example, the textual ads may be, among other things, key word based, content center based, site mapped, business process oriented, click-based, and such. The branded ads may be purchased by third part service providers 106 and include graphical banners, text, or other multimedia presentations or content. Illustrated content center module 134b generally is any module that may include, reference, generate, or otherwise present a business community that serves as a target for advertising and collaborates to make the business more efficient services related to the business processes and business best practices. For example, the content center module 134b may include local services, business management best practices, a business process oriented content center, community forums and blogs, and many others.

For example, the small business services module 134c may comprise a "one-stop" center to enhance aspects of online operations. Such services may include: i) web hosting or tools and infrastructure to build a professional looking web site; ii) merchant solutions—platform to build, manage, and market an online store; iii) business email—communications with custom email addresses, spam protection, and email storage; iv) domain registration; v) marketing tools—local enhanced listing and sponsored search; vi) internet access; and vii) recruiting services or online job postings. Other services may include those provided by third-party vendors 106 including VOIP (Voice over Internet Protocol) and messenger services. Example e-commerce module 134d generally allows business 104 to establish an on-line presence. This may include the offering of services, becoming an internet merchant, or other network-based business. Accordingly, module 134d may offer wizards to develop on-line business processes, tools to develop web pages or microsites, and many other tools and services.

Figure 3:
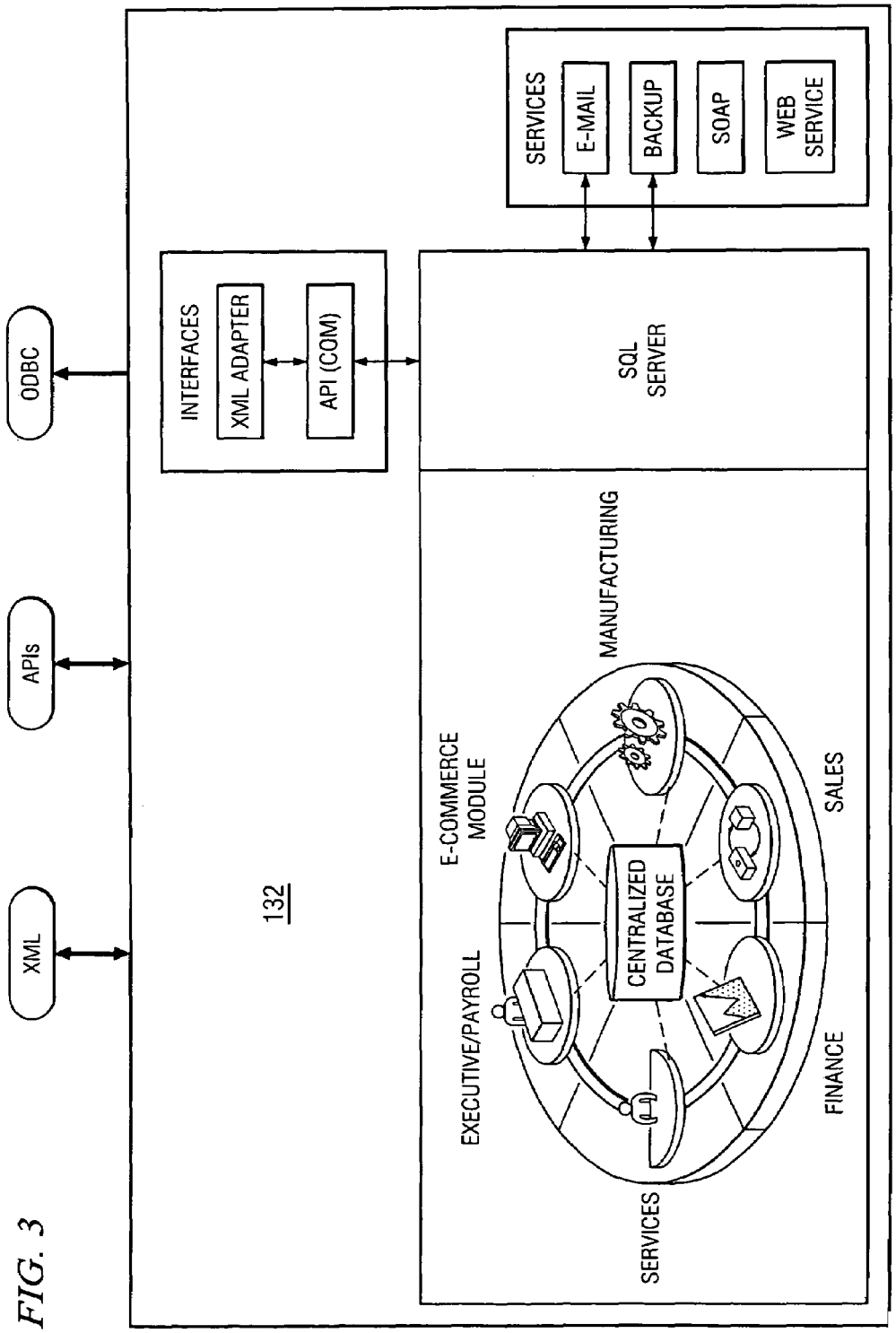
FIG. 3 illustrates an example application implementing certain techniques and components in accordance with one embodiment of the system of FIG. 2.
Figure 14:
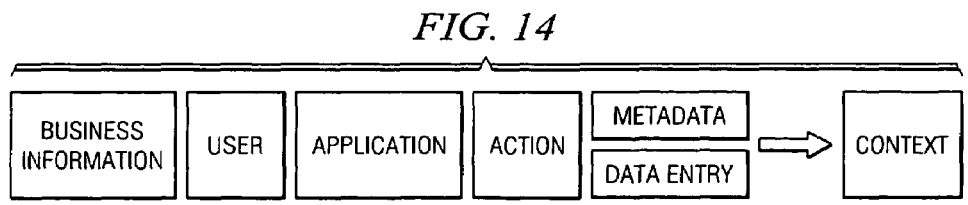
FIG. 14 provides a graphical view of example information used to create a user context data structure.

FIG. 3 illustrates more detail of example business application 132 that, among other things, provides business functionality to the user and dynamically presents elements based on user context in accordance with one embodiment of the present disclosure. For example, such applications 132 provide a user with the ability to view and interact with elements displayed based on his user context, such as location or role, and other data—as well as the respective metadata—present in the particular interface. Put another way, application 132 determines the user's context, identifies certain data objects retrieved for the respective user interface, and displays presentation elements based on such user context and data objects. These ads and the processing to determine the appropriate content to display may be partially or fully distributed the hosted services 134 or performed internally by application 132 as appropriate. As illustrated in FIG. 14, application 132 (or 134) may determine the appropriate user context-data combination using any appropriate source of user context including business 104, information, data associated with the user, application 130 (or one its components), previous or current actions performed by the user, as well metadata, data entered by the user, and many other sources. More specifically, application 132 may use these sources to identify some portion of the user's role in a business, his business, a business application or process, and/or business activity of the user, business, or process or data that may assist application 132 in providing a contextual solution. For example, such information may include: (1) information that is related to the user due to explicit or implicit collaborative relationships such as team/project membership or community membership; (2) information that is similar to a given business object in a semantic space based on text retrieval and extraction techniques; (3) recent procedures or other actions of the user; (4) other people performing the same or similar activity; (5) explicit relationships on an organizational or project structure; (6) information about the underlying business context; and/or (7) information about the people involved in a collaborative process. Application 132 may dynamically update or replace the presentation elements as the user context changes and/or as the data objects change; in other words, certain processing is determined, at least in part, at run-time based on one or more variables. For example, as the user proceeds through the particular business process (or changes processes), application 130 may automatically update the presentation elements (such as sponsored advertising or contextual help) based on this progress or step in the process. More specifically, application 132 may allow for or provide directed advertising, related help text, or other presentation elements that are selected or generated based on the user and the respective data on the screen. Such dynamic presentation within application 132 may deliver quick access to highly accurate, business-critical information, empower business users, or provide end-to-end visibility, while concurrently offering an easy-to-use interface.

For example, application 132 may be a composite application, or an application built on other applications, that includes an object access layer (OAL) and a service layer. In this example, application 132 may execute or provide a number of application services, such as customer relationship management (CRM) systems, human resources management (HRM) systems, financial management (FM) systems, project management (PM) systems, knowledge management (KM) systems, e-commerce compatibly and functionality, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform Further, composite application 132 may run on a heterogeneous IT platform. In doing so, composite application may be cross-functional in that it may drive business processes across different applications, technologies, and organizations. Accordingly, composite application 132 may drive end-to-end business processes across heterogeneous systems or subsystems. Application 132 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability.

It will be understood that while this example describes a composite application 132, it may instead be a standalone or (relatively) simple software program integrated with other hosted modules 134 or functionality. Regardless, application 132 may also perform processing automatically, which may indicate that the appropriate processing is substantially performed by at least one component of system 100, such as that illustrated in FIG. 2. It should be understood that automatically further contemplates any suitable administrator or other user interaction with application 132 or other components of system 100 without departing from the scope of this disclosure.

Regardless of the particular hardware or software architecture used, application 130 is generally capable of allowing multiple users from one or more businesses 104, determining secondary content (such as advertisements) based on the context of the particular user, and execute various other business processes and techniques. As described in more detail elsewhere in the disclosure, this user context may be based on user information, as well as business information and application data. Some of these processes, such as providing target secondary content and providing feedback on such content, are illustrated in certain flowcharts described below. The following descriptions of the flowcharts focus on the operation of application 130, or one of its components 132 or 134, in performing the respective method. But system 100 contemplates using any appropriate combination and arrangement of logical elements implementing some or all of the described functionality. For example, some or a majority of the processing or other techniques may be implemented by business application 132, one of the service components 134, or other invoked or referenced libraries or sub-modules not illustrated.

Figure 4:
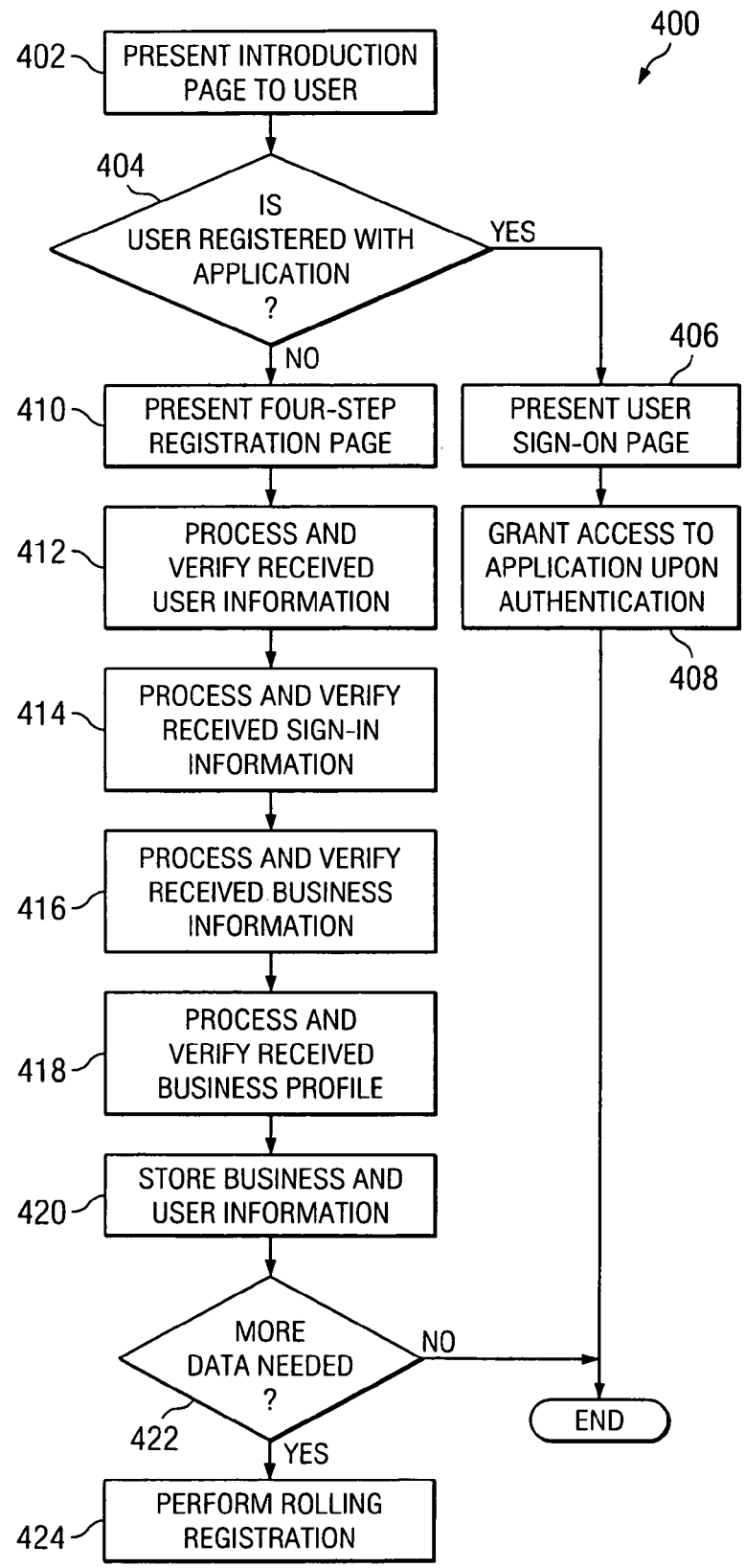
FIG. 4 is a flowchart illustrating an example method for processing user registration into the system of FIG. 1.

FIG. 4 is a flowchart illustrating an example method 400 for processing user registration into system 100. Generally, method 400 describes the registration of a new user of application 130 and the various processes involved in collected needed or optimal user and business information. In certain cases, application 130 may automatically register the user without presenting a wizard or implementing a similar method 400. In other cases, business 104 may activate or register application 130, without any subsequent user registration. But returning to illustrated method 400, application 130 presents an introduction page to a user at step 402. This introduction page is typically presented based on a request from the client 104, such as an HTTP request for a web page. The introduction may present information such as, for example, marketing text, feature descriptions, a narrated video tour, testimonials from other businesses 104 and customer 108, and advertisements for partners or vendors 106 (e.g. offers of free subscriptions). Next, at step 404, application 130 determines if the requesting user is already a registered user. Such a determination may be made using a cookie, a user selection, or via other techniques. If the user is already registered, then application 130 grants presents the user with a sign-in page at step 406 (illustrated at FIG. 5A as GUI 136a) and grants the user access to application 130, or more specifically business application 132, upon authentication at step 408. The sign-in page 136a may include or present a user name field that uses an email address, remembers access within cookie if user requests, and field is pre-populated with user's address. Page 136a also typically includes a password field that may be user-specified and hint available if the user forgets. This password may first be sent through email and be as complex as necessary to help assure security. The sign-in page or the first page after authentication may also display application news and insights such as new features, new services, new partners, how-to tips, small-business advice, and others.

But if the user is not a registered user, then application 130 may the display the general registration process that the new user will follow at step 410. For example, such registration may include four steps, namely user information, sign-in information, business information, and business profile information. In this example, application 130 collects and verifies user information at step 412 using GUI 136b illustrated at FIG. 5B. This information may include the registrant's first and last name, the registrant's email address (typically used as username for sign in and provides immediately-useful contact information), and the registrant's role in business 104. This role may be selected from a limited, very general list to help normalize roles across businesses 104. In certain cases, this list presented to the user after business data is gathered so that it may be populated based on the business type or other business context. Next, at step 414, application 130 collects and verifies sign-in information using GUI 136c illustrated at FIG. 5C. This sign-in information may comprise the registrant's password (perhaps entered twice to ensure accuracy), a password hint, and the registrant's personal identification information to enable support to verify user.

Figure 5E:
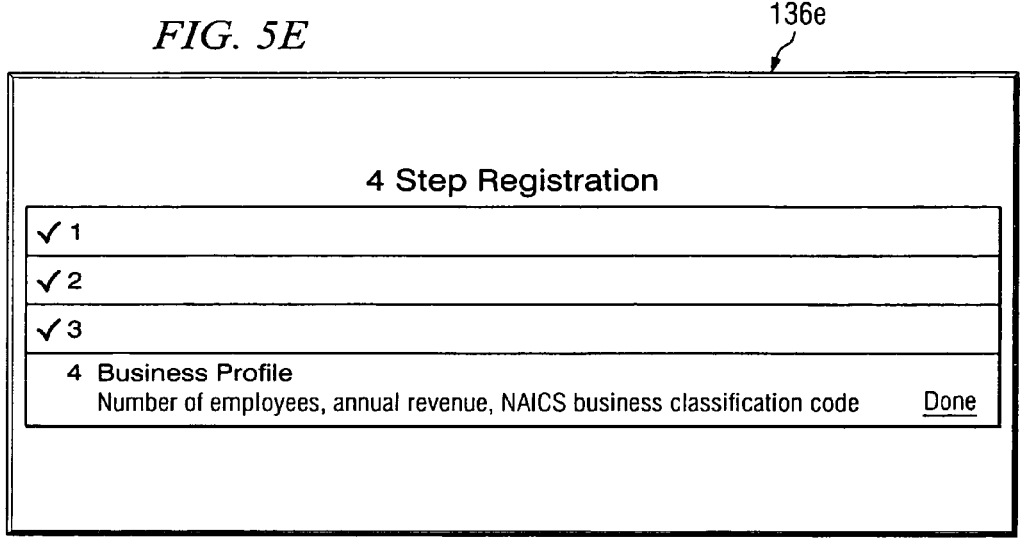

As illustrated, application 130 then collects and verifies the business data to help provide some context and enable subsequent rolling registration. For example, at step 416, application 130 collects and verifies business information such as the business names (often both official or how the business is known legally and public or how the business is known to its customers), phone number, business address, web address, primary contact email address, or other useful business contact information, such as illustrated FIG. 5D using GUI 136d. Application 130 may then, at step 418, collect and verify business profile information using, for example, GUI 136e as illustrated at FIG. 5E. This interface may request the number of employees, which is used to define initial product configuration and to change advertising exposure. The interface may also collect the known or expected annual revenue range and the NAICS (North American Industry Classification System) code. This code is a standard business activity numbering used by the IRS and, if it is not known by the user, then application 130 may invoke a wizard to guide the user to the appropriate code. This collected information is then stored in repository 120 for subsequent processing at step 420. For example, if more information is needed (as illustrated at decisional step 422), then application 130 may execute a rolling setup as appropriate at step 424. This rolling setup may be performed as business processes are executed or requested and may include, among other things, conversion from prior legacy business applications and adding employees, inventory, and other details.

Figure 6:
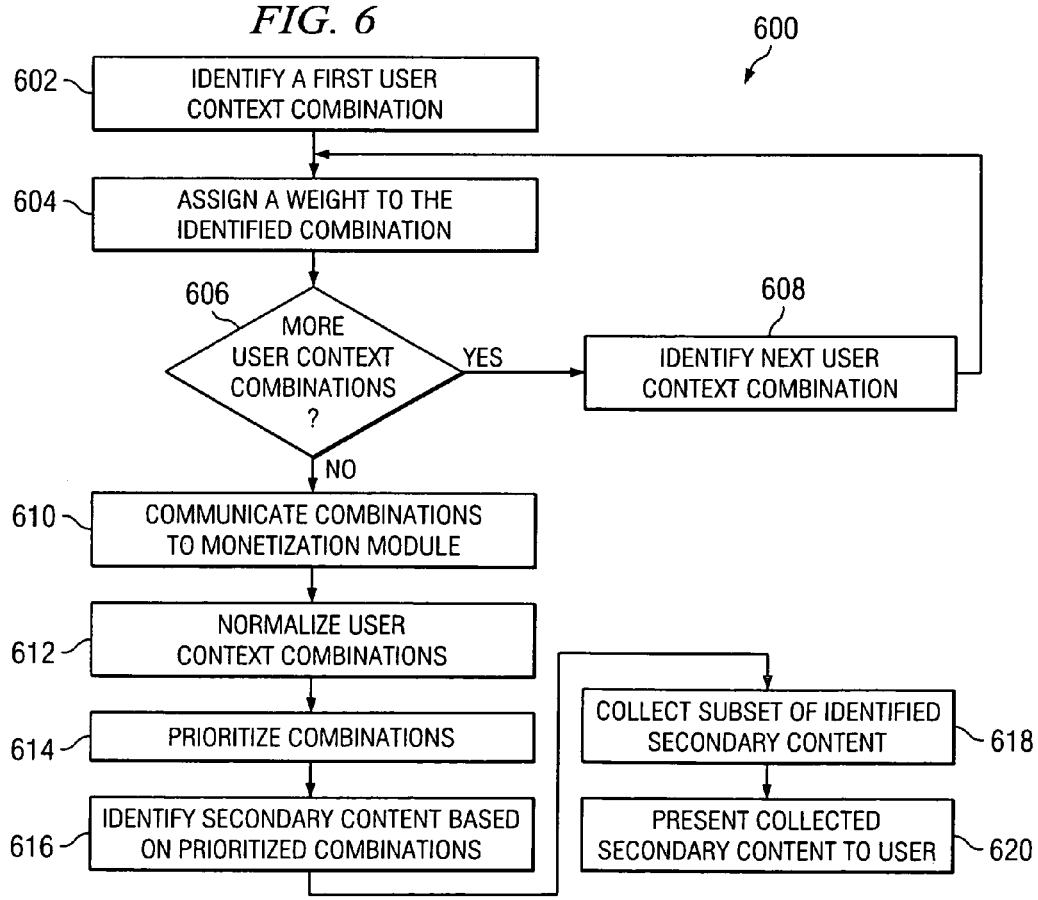
FIG. 6 is a flowchart illustrating an example method for processing the user context as implemented by the application described in FIG. 2.

Once the user and business information has been collected, this demographic information may be used to help determine user context combinations. These context combinations are typically further coded based on prior advertising success or failure, current data or business processing, business status, and many other components or criteria. These context and advertising techniques may be run concurrently with any business processing to allow application 130 to provide advertisements or other content on an "as-needed" basis. FIG. 6 is a flowchart illustrating an example method 600 for processing such user context as implemented by application 130. Method 600 begins at step 602, where application 130 identifies a first user context combination. For example, application may identify the particular user and his role, the business type, or other demographic information. The context may then be supplemented based on the particular processing occurring and the data involved in such processing. The context may include any number of combinations. For example, a first combination may be coded using the user's role, the business type, and the customer of the sales order. A second combination may be coded based on the business location, the customer location, and total weight of the order. Yet a third example combination is coded using approved vendors of each item, the associated costs of each item, expected shipping date from the vendor, and shipping costs. It should be understood that these combinations are for example purposes and any number of combinations based on any metadata or data may be used. Once a first user context combination is identified, application 130 may then assign a weight to the identified context combination at step 604. This weight may be based on any appropriate criteria or intelligence such as the importance of the particular piece of demographic data in the current business process. Application 130 then continues to collect, identify, or calculate further user context combinations as appropriate and as illustrated in steps 606 and 608. Once these combinations have been gathered, then application 130 communicates them to a monetization module 134a for subsequent processing at step 610. This communication may be a local inter-process communication or a transmission to a distributed module.

After receipt, monetization module 134a may normalize the user context combinations at step 612. Such normalization may include transforming roles or business types to an expected format, normalizing weights, or any other data massaging. For example, a first business 104 may identify a first role as a supervisor, while a second business 104 may identify the first role as a manager. In this example, module 134a may automatically normalize these first roles to one identifier to allow for concurrent processing of both businesses for subsequent processing. Once the context information is a suitable format, then application 130 processes the combinations to determine the secondary content to select and present to the user. For example, at step 614, monetization module 134a may prioritize the combinations. This priority processing may include sorting, dropping unimportant or unrelated context information, or any other processing. Next, module 134a identifies secondary content from the presentation elements 140 stored in memory 120 at step 616 based on the user context information. As described above, this content may also (or partly) be stored remotely or may be dynamically retrieved from other locations or parties as appropriate. This identified content may then pared down using any criteria at step 618. For example, application 130 may collect only content associated with the higher-priority context combinations. In another example, application 130 may determine a suitable number of advertisements or other content elements 140 based on the resolution or the size of the user's interface. In a further example, application 130 may collect certain secondary content based on partnerships or deals with certain vendors or service providers 106. Once collected, at least a subset of this secondary content is then presented to the user in some fashion as shown at step 620.

FIGS. 7A-D illustrate example graphical user interfaces (GUIs 136f, g, and h respectively) of application 130 for processing user contexts as described in method 600. Generally, GUI 136 provides a similar front-end for local or distributed application 130. Interface 136 may be presented by a web browser that displays appropriate network pages including HTML, Java, PHP (self-referential PHP: Hypertext Preprocessor), ASP (Active Server Pages), or other pages populated, at least in part, by application 130. In this case, each service 202 includes at least a portion (whether frame, tab, or window) for displaying a visible portion of data elements 116 (often transaction data 202) and another portion for presentation elements 140. Each portion may be hidden, minimized, or otherwise placed out of sight of the user, while still being considered "presented." In certain embodiments, data elements 116 may contain only the transaction data 202; but in other cases, data element 116 may also include foreign keys, record identifiers, and other data storage-oriented information that may not be pertinent or useful to GUI 136. As used herein, transaction data is any application or business data that is stored or otherwise referenced in data elements 116. For example, GUI 136 may present i) financial accounting such as financial transactions, including general ledger, account setup and maintenance, journal entries, foreign currency adjustments, and budgets; ii) bank transactions such as cash receipts, check writing, deposits, advance payments, credit card payments, and bank reconciliation; iii) sales and distribution data including price quotes, customer orders, delivery data, stock balances, and other invoices and accounts receivables; and iv) purchasing information such as vendor contracts and transactions, issuing purchase orders, in-stock numbers, the value of imported items, returns and credits, and other payment transactions. In another supplemental or complementary example, GUI 136 may present CRM data, which may include i) sales opportunity management data from the first phone call to the successful close of a transaction; ii) business partner information about customers, resellers, and vendors, including profiles, contact summaries, account balances, and sales pipeline analysis; and iii) service management information involving service operations, contract management, service planning, tracking of customer interaction, and customer support.

First example GUI 136f presents a menu for allowing the user to easily move between respective businesses modules, processes, and services 202 and data 204. Such an interface may allow the user to drill down on desired information or other related or child transaction data. More specifically, interface 136f may include a functional area with a plurality of such processes and services 202, each with one or more sub-levels, and some data. For example, illustrated GUI 136f includes a number of processes or services 202, specifically administration, financials, sales opportunities or leads, accounts receivable, accounts payable, and others through reports. As illustrated, report process 202 includes two sub-levels: overdue debts and customer debts. The example right-hand side of GUI 136f presents a sales order with a plurality of data 202. For example, the illustrated sales order includes header information, such as an order number and order date, and a number of order lines with various detail such as items, amounts, and price. This header or the lines may further include hidden data 202, or data that is not presented on this particular screen, such as add on charges, taxes, shipping location, comments, salesman, kits, and others. The data presented, hidden, or otherwise collected or calculated may be based on the user's selection of process 202, the particular stage or step of the process, or any other criteria. Once the respective data is presented (or concurrently with the presentation), application 130 may determine the context of the user based on the process and the current step, the meta data and data involved, and the user demographics. As described more fully elsewhere in this disclosure, this context may be partially predetermined based on information gathered during user and business 104 registration.

Figure 7A:
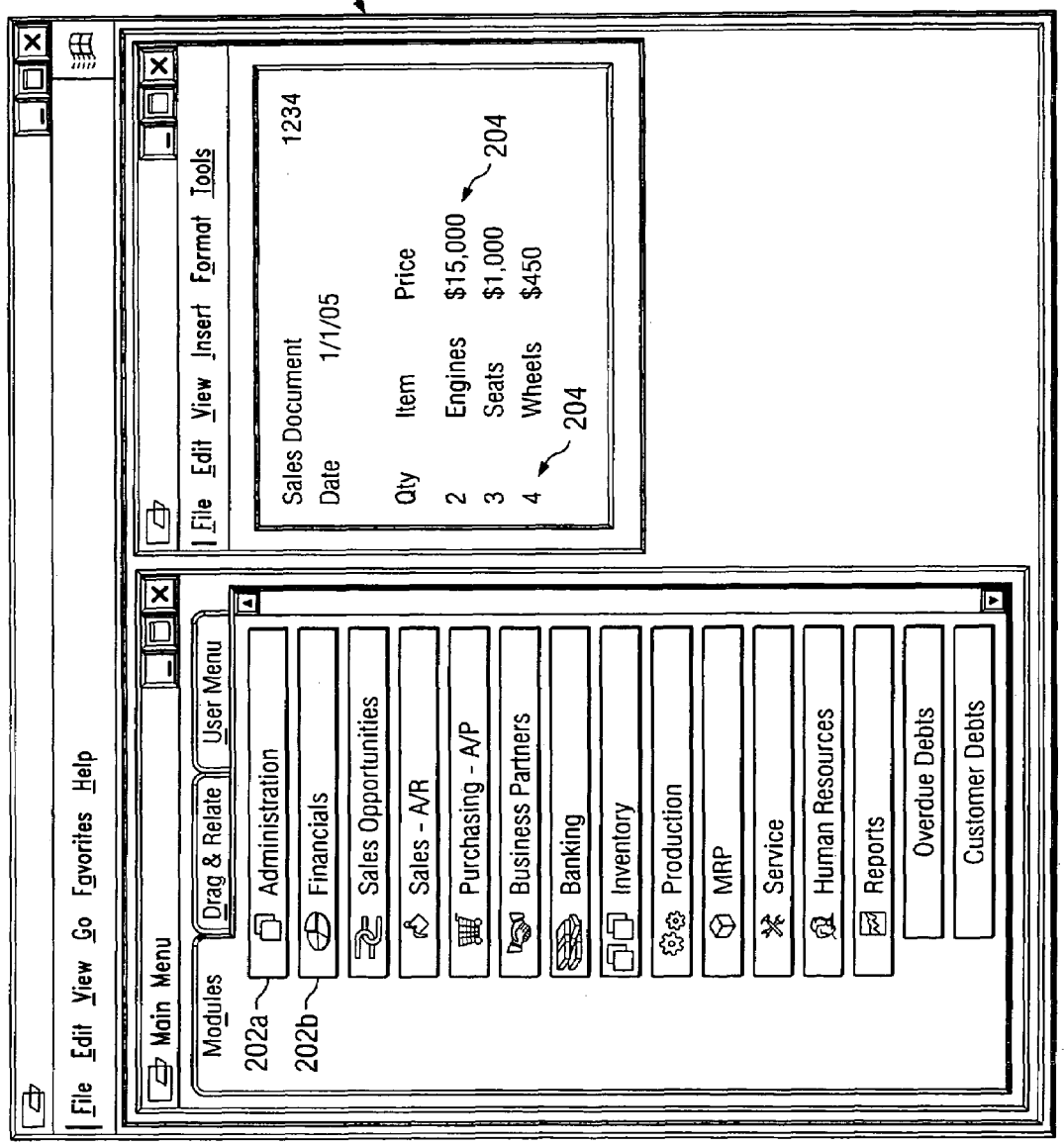
FIGS. 7A-D illustrate example GUIs for processing the user context as implemented by the application described in FIG. 2.
Figure 7B:
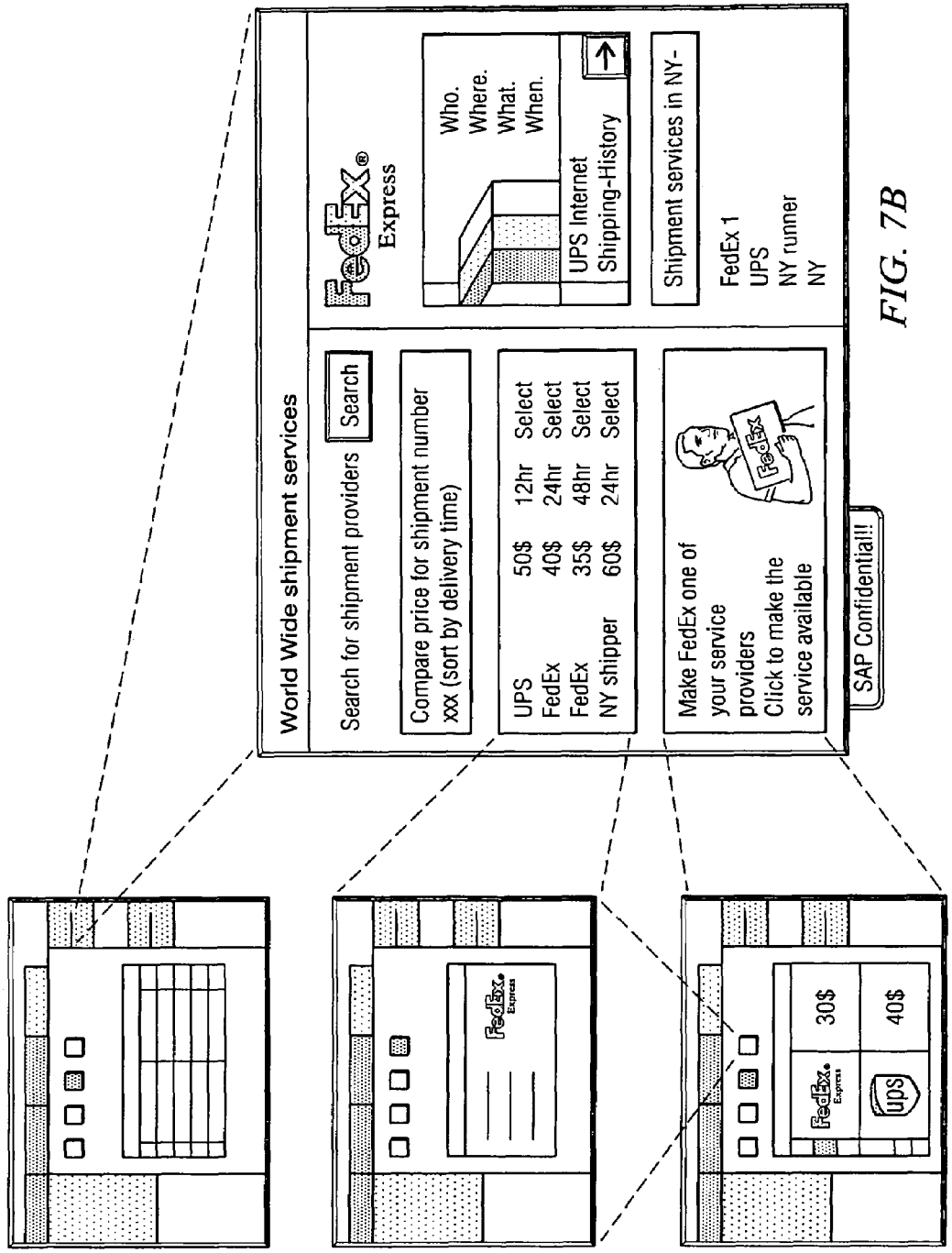
Figure 7C:
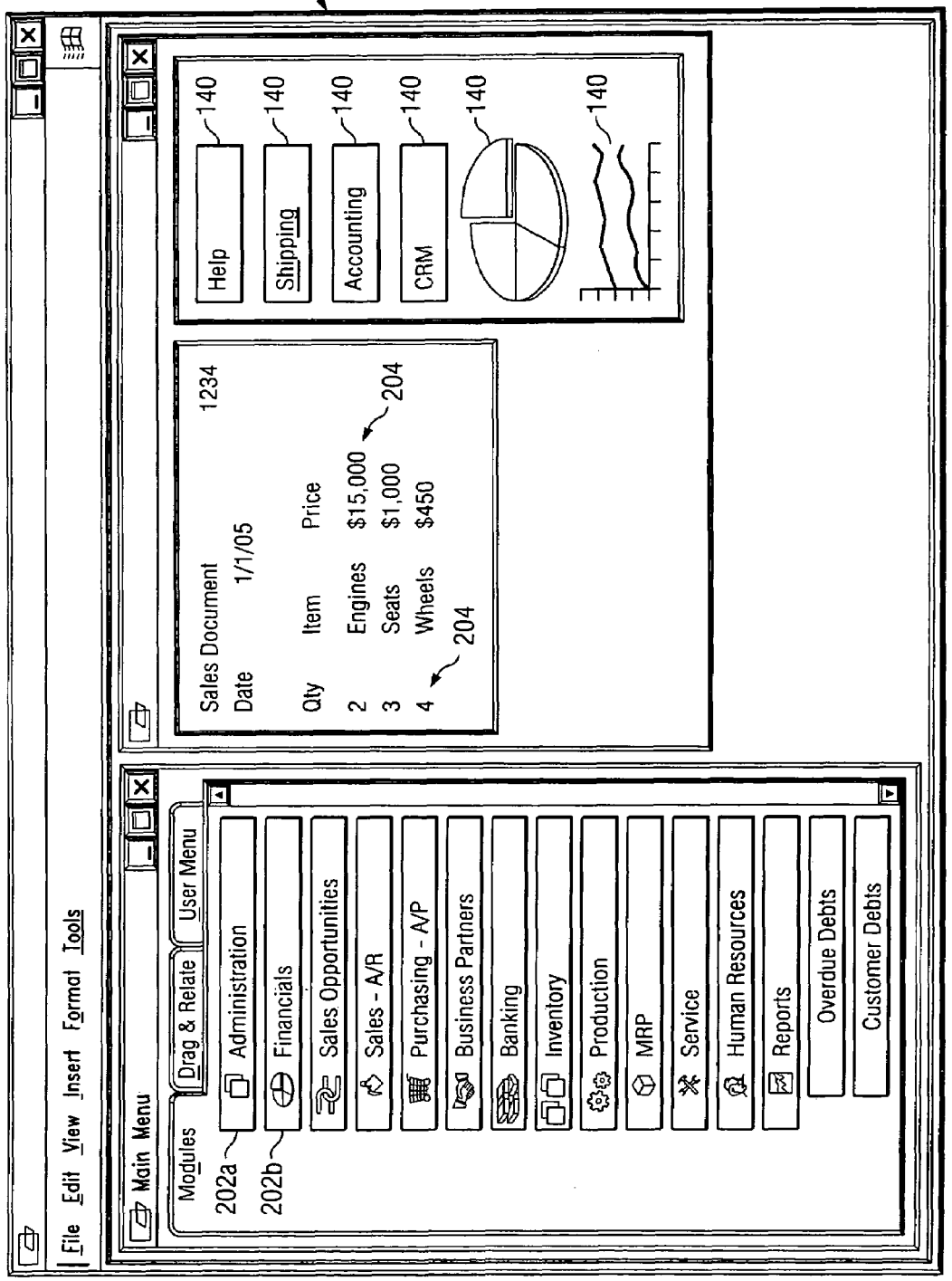
Figure 7D:

Once the appropriate user context-data combinations are identified, then application 130 determines presentation elements 140 to be presented to the user using processing similar to that illustrated in FIG. 7B. At this high level example, application 130 determines appropriate service providers (whether tightly or loosely coupled) based on the user context and allows the user to select one of these providers. More specifically, application 130 may first identify first level secondary content that includes advertisements (whether integrated in application 130 or provided by another application or process), buttons or other interactive elements, and such. For example, application 130 may determine that the optimal (or desired) use of these combinations may result in the appropriate advertisements and other secondary content being illustrated help content, a shipping service, an accounting process, a CRM process, and several graphical analyses of business data (see GUI 136g illustrated in FIG. 7C). If the user selects one of these elements 140, then second level secondary content may be provided, which provide more detail or options for the respective first level secondary content. Continuing this example, the user may select the shipping element 140, resulting in example GUI 136h illustrated in FIG. 7D. This e-commerce functionality helps the user select a shipper for this particular order. The presented shippers may be partially based on providers pre-selected by the user, then supplemented by intelligently processing the user context combinations. In another example, the user may dynamically select a particular shipper based on a secondary user or business context. Based on any particular combinations of transaction data 202 and the context of the user, GUI 136 also displays presentation elements 140 (described in more detail above) as illustrated in FIGS. 7B-D. Of course, these interfaces are for example purposes only and application 130, or its components (such as 132 and 134) may provide any suitable interface operable to display at least transaction data 202 and one or more presentation elements 140—indeed, such displayed information may be communicated or presented in any suitable format or layout.

FIG. 8 is a flowchart illustrating an example method 800 for providing dynamic contact pages based on user context. This technique may be executed automatically based on the business process being performed for business 104 or at the request of the particular user. For example, application 130 may automatically communicate a contact list of service providers 106 to the client when an invoice is created. Generally method 800 describes application 130 collecting user context information of the particular user and dynamically and efficiently determining one or more service providers 106 for presentation to the user in a contact list or "yellow pages" type format. For example, illustrated method 800 begins at step 802, where application 130 determines the user context, potentially including a plurality of user context combinations of demographic information and application data. The user context combinations are then parsed into context combinations as appropriate at step 804. Such categorization may assist in quickly identifying providers 106 for the respective portion of the business process. For example, application 130 may parse the combinations into customer 108 associated combinations, business 104 associated combinations, item associated combinations, and such.

At step 806, application 130 identifies the first context category. Next, it selects one or more providers 106 associated with this category at step 808. The selection may be based on location, provider type, contracts, or other criteria. Application 130 may then prioritize the providers 106 at step 810 using prices, advertising deals, expected ship times, and such. If there are more categories to be processed at decisional step 812, then application 130 identifies the next category and processing returns to step 808. Once the appropriate providers 106 have been identified, then application 130 bundles the provider information at step 816 and communicates the bundle to the client at step 818. It will be understood this gather information may include only a pointer to speed up processing and reduce communication requirements. Once the client receives the bundle and presents a subset or when the user selects a particular provider 106, then application 130 may communicate the appropriate contact information at step 818. For example, this contact information may include a phone number, a website, an email address, or any other identifier that may assist business 104 in the particular business process.

FIG. 9 is a flowchart illustrating an example method 900 involving the content center module 134b. Method 900 begins at step 902, where application 130 invokes content center module 134b. At any subsequent appropriate time, application 130 determines a plurality of user context combinations at step 904. Such determination may occur over time such as a user/business profile 145 generated at user registration, which may be logically supplemented by rolling setup, application data, and other contextual information. Based on this user context, application 130 may then determine one or more content center services at step 906. For example, application 130 may embed a hyperlink to the determined services in the interface at step 908. In another example, application 130 may execute the particular service at step 910. In a further example, application 130 may generate a form as illustrated at step 912. In yet another example, application 130 may reference invoke, or otherwise present support services at step 914. While described singularly, it will be understood that application 130 may perform more than one of these processes to efficiently present content center services in a user friendly manner. Moreover, these example processes may represent a subset of the various manners in which application 130 can present such content center services.

Figure 10:
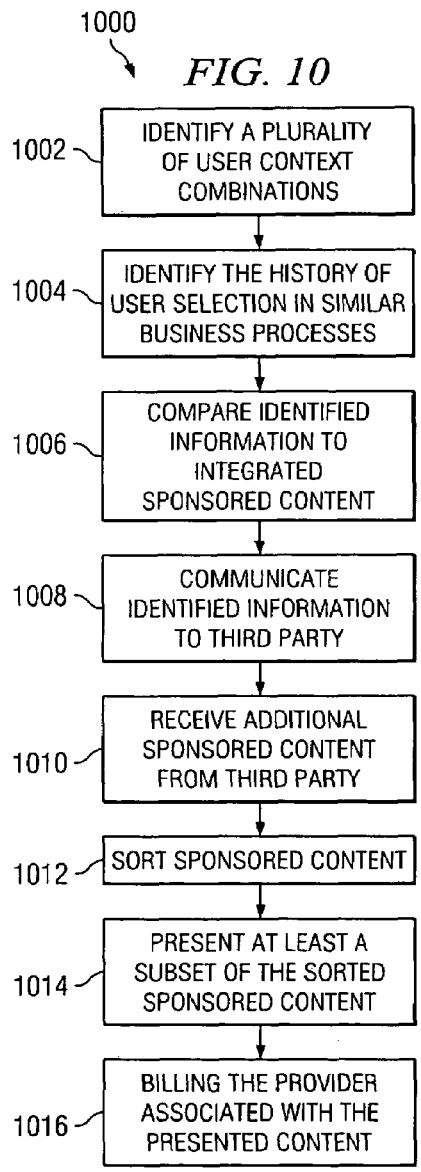
FIG. 10 is a flowchart illustrating an example method for providing target advertising based on user context.

FIG. 10 is a flowchart illustrating an example method 1000 for providing target advertising based on user context. Such target advertising may provide the host of, the developer of, or another entity associated with application 130 with fees from sponsored content or other advertising involving a particular service provider 106. The fees may be flat fees, fees associated with a number of active hits, fees associated with the amount of displays, or any other dynamic or static criteria often determined by contract provisions. Method 1000 begins at step 1002, where application 130 identifies a plurality of user context combinations. As described above, these combinations may represent a number of different context pairs or groupings at any granularity stored in one data structure, object, record, or file. Next, at step 1004, application 130 may identify the history of user selections in similar situations as that currently in process by application 130. These user selections may include purchases, selected or invoked links, or any other input or selections made by the user or users as appropriate. For example, if the user is currently invoicing a customer, then application 130 may look at the prior requests or selections by the user for other invoices. Based on this identified information, application 130 may determine sponsored content integrated into or tightly-coupled with the respective module or business process at step 1006. At step 1008, application 130 may then communicate this identified contextual information to a local or remote third party, such as the entity hosting the particular module. Once processed, then application 130 may receive additional sponsored content from this third party at step 1010. Regardless of the particular technique for gathering sponsored content, application 130 sorts the sponsored content using any suitable parameters at step 1012. For example, application 130 may determine that some content is more appropriate for the user, business or process. In an alternative or complementary example, application 130 may determine the level of revenue or cost associated to help determine the prioritization. At step 1014, application 130 then presents at least a subset of the sponsored secondary content to the user via GUI 136. Next, the providers 106 associated with the selected sponsored content are billed at step 1016. As described above, these bills may include or consist of flat fees, number-based or success-based fees, or others. Moreover, each bill may be physically or electronically transmitted to the particular provider on any time basis, including per instance, per week, per month, and so on. Further, instead of a traditional bill, a financial or billing account of the particular provider 106 may merely be debited or credited as appropriate.

Figure 11:
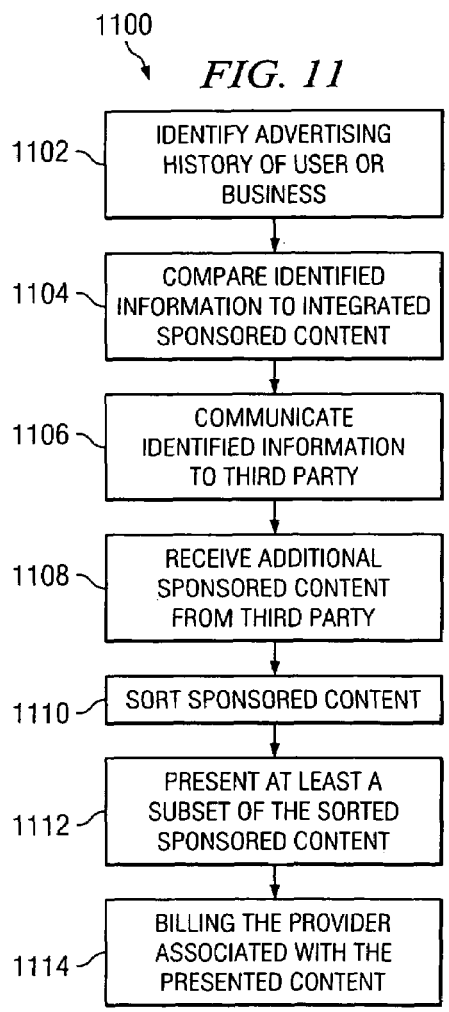
FIG. 11 is a flowchart illustrating an example method for providing target advertising based on previous advertising.

FIG. 11 is a flowchart illustrating an example method 1100 for providing target advertising based on previous advertising. As with method 1000, such target advertising may provide the host of, the developer of, or another entity associated with application 130 with fees from sponsored content or other advertising involving a particular service provider 106. The fees may be flat fees, fees associated with a number of active hits, fees associated with the amount of displays, or any other dynamic or static criteria often determined by contract provisions. Further, the techniques of method 1100 may supplement the techniques of method 1000 to locate additional advertising or generate additional revenue. Method 1100 begins at step 1102, where application 130 locates and processes the advertising history of the particular user and/or his business to identify similar scenarios and enhance the secondary content to be presented. This history may include advertising previously selected by the user or business, providers 106 previously selected or approved by the user or business, or any other secondary content history that may help target the advertising presented. For example, the user selections may include purchases, selected or invoked links, or any other input or selections made by the user or users as appropriate.

Based on this identified history, application 130 may determine sponsored content integrated into or tightly-coupled with the respective module or business process at step 1104. At step 1106, application 130 may then communicate this identified contextual information to a local or remote third party, such as the entity hosting the particular module. Once processed, then application 130 may receive additional sponsored content from this third party at step 1108. Regardless of the particular technique for gathering sponsored content, application 130 sorts the sponsored content using any suitable parameters at step 1110. For example, application 130 may determine that some content is more appropriate for the user, business or process. In an alternative or complementary example, application 130 may determine the level of revenue or cost associated to help determine the prioritization. At step 1112, application 130 then presents at least a subset of the sponsored secondary content to the user via GUI 136. Next, the providers 106 associated with the selected sponsored content are billed at step 1114 as described in more detail above in respect to step 1016. Also, while not illustrated, application 130 may further store or append the additional content, as well as user actions involving such content, to the user or business history for subsequent access and processing.

Figure 12:
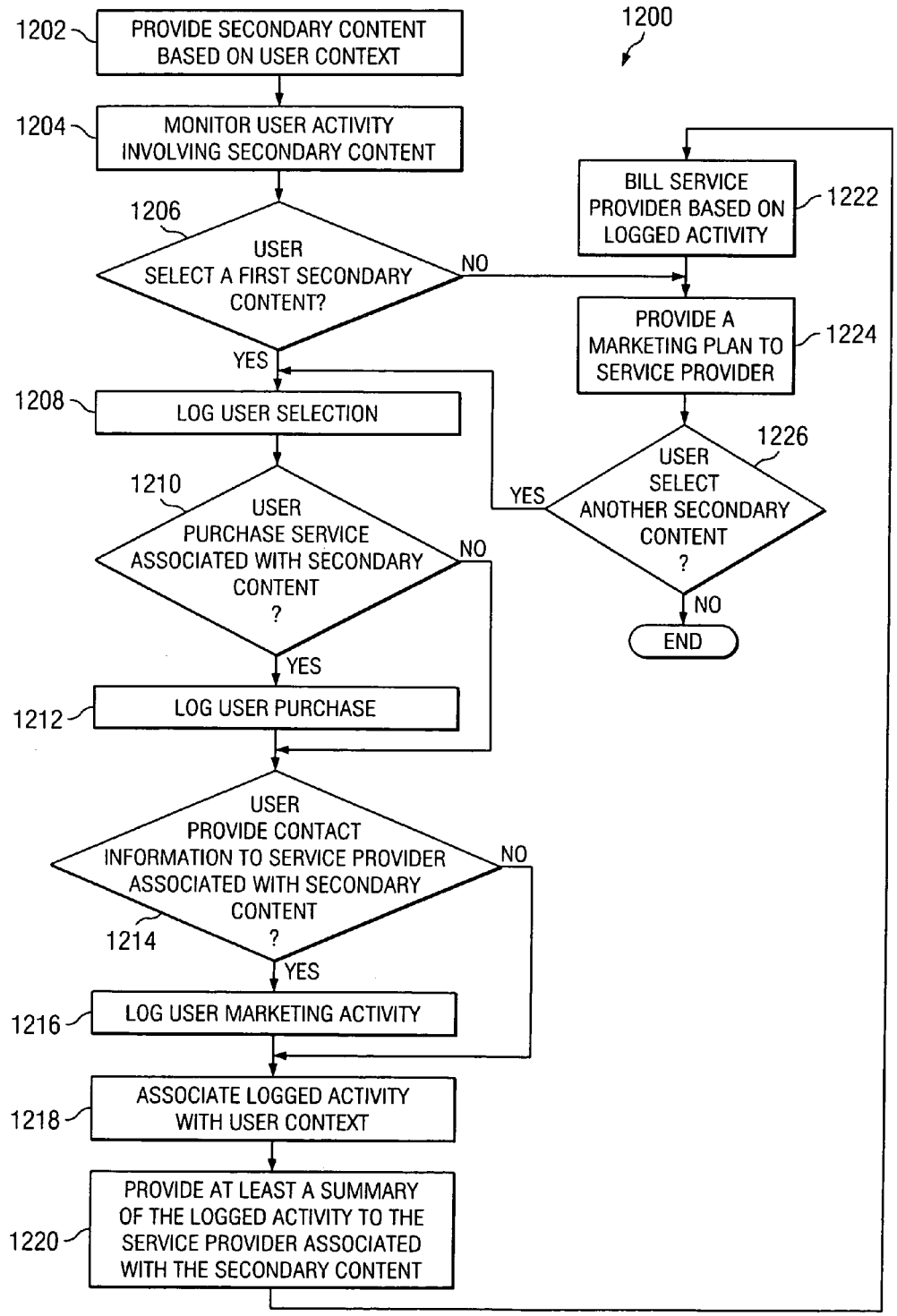
FIG. 12 is a flowchart illustrating an example method for managing feedback of service providers or users.

FIG. 12 is a flowchart illustrating an example method 1200 for managing feedback of service providers or users. Method 1200 generally involves application 130 monitoring user activity of secondary content for billing and feedback purposes. Illustrated method 1200 begins at step 1202 wherein secondary content, such as advertising, is provided to the user or business based on user context. Once this secondary content is provided by interface 136, then application 130 monitors user activity involving the secondary content. For example, if the user selects a first secondary content as shown by decisional step 1206, then this activity is logged at step 1208. Generally, application 130 may log this activity by maintaining a run-time list in internal memory or data structures, creating an audit trail, storing the particular activity in a text file, or using any other appropriate technique or structure. Next, application 130 may determine if the user purchased a service (or good) associated with the secondary content at decisional step 1210. For example, application 130 may determine that the secondary content is associated with a first service, but the user purchased or requested a second service by the same service provider 106. In this example (and perhaps according to certain contractual provisions), application 130 may log this activity for subsequent feedback as illustrated at step 1212. Regardless of a purchase, application 130 may also monitor for marketing activity by the user. For example, application 130 may determine that the user (or business 104) provided contact or follow-up information to the service provider 106 associated with the secondary content at decisional step 1214. Such example user marketing activity may also be logged at step 1216.

Once (or concurrently with) the various secondary activity of the user has been suitably logged, then application 130 may associate this activity with at least a portion of the user context at step 1218. It will be understood, that application 130 may attempt to preserve the privacy of the particular user or business and may instead monitor, log, and provide only generic (or non-specific) information such as business type, business size, revenue, and such. Next, at step 1220, application 130 provides at least a summary of the logged activity to the service provider 106 associated with the secondary content. For example, application 130 may merely provide a count of successful clicks, browse time, or other information deemed useful for marketing or feedback purposes. In some cases, a bill may then be transmitted to the service provider as described in earlier figures. Based on the successful (or unsuccessful) secondary content, application 130 may develop and/or provide a marketing plan to the particular service provider 106, thereby potentially enhancing future advertising efforts or increasing revenue. If the user selects another secondary provider at decisional step 1226, then processing returns to step 1208 and this subsequent user activity is also monitored as described above. Moreover, some or all of such feedback may be provided to the developer (or manufacturer) of application 130 or a process incorporated therein, from the host for example, to help tailor or better certain aspects of the business processing.

Figure 13:
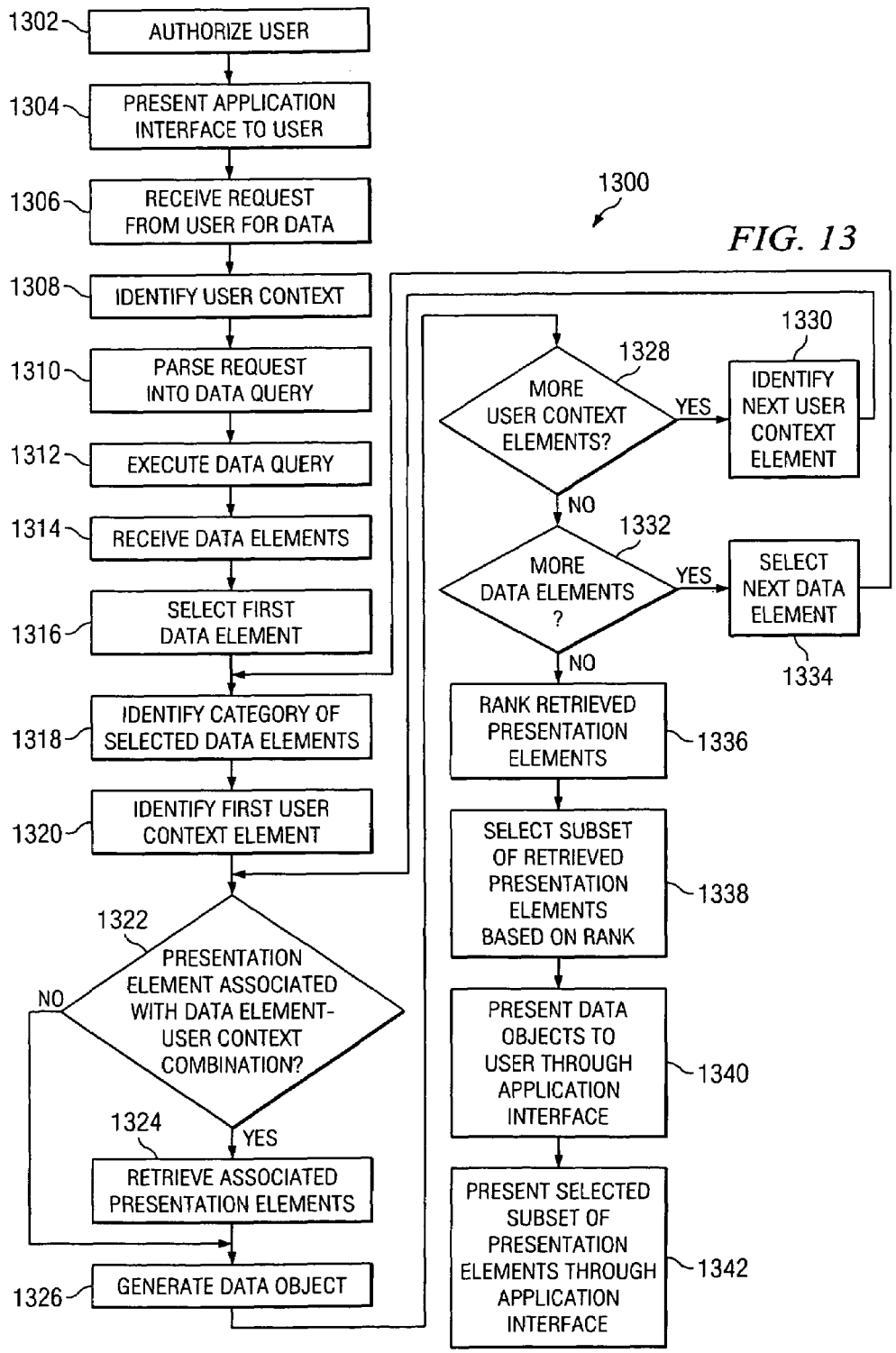
FIG. 13 illustrates an example method for dynamically presenting elements based on user context, potentially implemented by components similar to those described in FIG. 1, 2, or 3 in accordance with the present disclosure.

FIG. 13 illustrates an example method 1300 for dynamically presenting elements based on user context in accordance with one embodiment of the present disclosure. At a high level, method 1300 includes receiving a request 150 for data from a user and automatically identifying a user context of the user. A plurality of data objects 155 is then generated based on data elements retrieved in response to the request 156 from the user, with each data object comprising at least the respective data element and a class of the particular data element. At least a portion of the plurality of data objects is presented, with at least a portion of each data object being visible. A first presentation element 140 is also presented, with the first presentation element 140 selected based on at least a first of the plurality of data objects 155 and the identified user context.

Method 1300 begins at step 1302, where a particular user is authorized to access or otherwise use system 100. For example, this authorization may include a login through client 104's operating system that is passed along to server 102, a direct login to server 102, a login to network 112 through a web interface or tunnel, or any other appropriate authentication or verification technique. Next, application 132 presents an application interface 136 to the user at step 1304, perhaps via an interface similar to GUI 136a. At step 1306, application 132 receives a request 150 from the user for data. Application 132 identifies a user context of the particular user at step 1308. For example, application 132 may determine certain identifying characteristics of the particular user from client 104, request 150, or information gathered during the authorization process. Based on this or any other suitable data, application 132 then identifies or generates a context of the user using, for example, a user context profile 145 stored in memory 120. But, as described above, application 132 may dynamically determine the user context based on run-time algorithms and data without referencing or substantially processing such static structures.

Once request 150 is received, application 132 then parses request 150 into a data query 114 at step 1310. This data query 114 may be a SQL query, a Java object or method, or any other appropriate request or command for data elements 116 through any suitable interface such as ODBC (Open Data-Base Connectivity) or JDBC (Java Database Connectivity). Next, at step 1312, application 132 executes the generated data query 114. Based on this query, application 132 retrieves or otherwise receives certain data elements 116 at step 1314. As described above, application 132 may retrieve requested data elements from one or more locations such as local portion of memory 120 and distributed portion of repository 135. In this case, application 132 may execute multiple queries 114 across these locations and bundle the results upon receipt. Once the appropriate data elements 116 have been gathered and the user context 145 identified, application 132 then prepares to present an updated application interface 136 to the user.

At step 1316, application 132 selects a first data element 116 from the plurality of collected data elements 116. At step 1318, application 132 identifies a class, category, or other metadata of the selected data element 116. One category may be the data table storing or referencing the particular element 116, an algorithmic description of the particular data element 160, or any other suitable descriptor or metadata that helps categorize at least a subset of the received data elements 160. For example, the transaction data may be invoice line data such as item, price per unit, ship date, ship to location, and bill to information. In this example, the transaction data may be associated with other attributes and metadata such as audit information, information location, table name, time entry of the respective invoice, quality assurance data, and other customer relation pointers. Some data elements 116 may already include attribute and content metadata information. If the particular data element 116 has no associated metadata, then the data retrieval component (or other similar software or process) may examine the content of data element 116 to generate metadata accordingly. Indeed, even if some information, such as attribute or table information or content metadata, is included with data element 116, further metadata may be determined or generated to enhance data object 155. At step 1320, application 132 identifies a first user context element or data from the identified user context 145. As mentioned above, each user context element may be any piece of data that helps describe the user context, including projects, associated role or department, industry, and others. Using the identified data, application 132 then determines if there are one or more presentation elements 140 associated with the particular combination of data element 116 in the user context element as shown at decisional step 1322. If there are one or more particular presentation elements 140 associated with the particular combination, then application 132 retrieves or otherwise collects such associated presentation elements 140 at step 1324. Regardless of the processing of presentation elements 140, application 132 then generates or instantiates a data object 155 based on the particular data element 116 ay step 1326. Generally, data object 155 comprises any bundling, encapsulation, instantiation, interface, or other association of the particular data element 116 and other attribute and content metadata information. For example data object 155 may comprise a Java object that includes the transaction data stored or referenced in data element 116, the particular table or file that stores the element 116, a category or other data type of the element 116, and any number of other parameters or variables. Next, application 132 then determines if there are more user context elements within the identified user context 145 at decisional step 1328. If there are, then application 132 identifies the next user context element at step 1330 and processing returns to step 322, where application 132 identifies additional presentation elements 140 that may be associated with this particular data element 116. Once there are no more user context elements to process for this particular data element 116, then application 132 determines if there more data elements 116, retrieved or received at step 314, as illustrated at decisional step 1332. If there are more data elements 116, then application 132 selects the next data element 116 at step 1334 and processing returns to step 318, where application 132 attempts to identify or process the one or more combinations of the new data element 116 and the identified user context 145.

Once the various combinations of data elements 116 and the particular user context 145 have been identified and processed, application 132 then ranks or sorts the retrieved presentation elements 140 at step 1336. Next, application 132 selects a least a subset of the retrieved presentation elements 140 based on the rank, priority, or other sorting criteria at step 1338. At step 1340, application 132 then presents at least a subset of the generated data objects 155 through application interface 136. Of course, in certain circumstances, application 132 may only display certain transaction data 202 or other visible portions of the particular data object 155. Application 132 also presents the selected subset of presentation elements 140 via the application interface 136 at step 1342.

The preceding flowchart and accompanying description illustrate exemplary methods, 400-1300. System 100 contemplates using or implementing any suitable technique for performing these and other tasks. It will be understood that these methods are for illustration purposes only and that the described or similar techniques may be performed at any appropriate time, including concurrently, individually, or in combination. For example, a procedure similar to method 1300 may obtain or identify the context of the user during the login or authorization process and then dynamically poll client 104 to update certain elements of the user's context. In another example, a procedure similar to method 1300 may instead determine a requested class or category of data elements 116 upon receiving the request 150 and, therefore, may not process elements 116 individually. In yet another example, the procedure may determine the class of data at the time of the request 150 and may determine further combinations of data and user context based on the transaction data of one or more of the individual data elements 116. In addition, many of the steps in this flowchart may take place simultaneously and/or in different orders than as shown. Moreover, system 100 may use methods with additional steps, fewer steps, and/or different steps, so long as the methods remain appropriate. For example, if there are a limited amount of identified presentation elements 140, such that the identified elements 140 may fit on the user's screen, then application 132 may not sort or rank the presentation elements 140 to identify a subset to be displayed.

Although this disclosure has been described in terms of certain embodiments and generally associated methods, alterations and permutations of these embodiments and methods will be apparent to those skilled in the art. For example, certain embodiments of system 100 may be a standalone, but networked, client that retrieves local information, identifies the context of the local user, and provides presentation elements associated with remote objects, applications, or other data accessible via the network. Accordingly, the above description of example embodiments does not define or constrain this disclosure. Other changes, substitutions, and alterations are also possible without departing from the spirit and scope of this disclosure.

What is claimed is:

1. A computerized method for causing one or more processors to identify service providers to a business, the method comprising the following steps performed by one or more processors:

identifying through a business application provided to a business a plurality of business context combinations of targeted data associated with the business, wherein at least one of the business context combinations includes a business class of the business;

parsing the plurality of business context combinations into at least one category;

identifying service providers for the business based on the business class and one of the categories;

prioritizing the identified service providers; and providing information associated with the identified service providers to the business based on the prioritization of the identified service providers.

2. The method of claim 1, further comprising also identifying service providers for the business based on a locality of the business.

3. The method of claim 1, further comprising populating a service provider list with the identified service providers for communication to the business.

4. The method of claim 3, further comprising providing the service provider list via the business application.

5. The method of claim 1, further comprising configuring the business application to permit a user of the business application to contact the service providers through the business application.

6. The method of claim 1, further comprising configuring the business application to permit a user of the business application to engage the service providers through the business application.

7. The method of claim 4, further comprising populating the service provider list during deployment of the business application.

8. The method of claim 1, wherein one of the business context combinations includes at least one of business information, demographic information, and information associated with a user of the business application.

9. The method of claim 1, wherein the prioritization of the identified service providers is based on one of price, advertising deals, and expected delivery time.

10. The method of claim 1, wherein the provided information includes contact information associated with the identified service providers.

11. A computer program product encoded on a tangible medium, the product storing computer readable instructions for causing one or more processors to perform operations comprising:

identifying through a business application provided to a business a plurality of business context combinations of targeted data associated with the business, wherein at least one of the business context combinations includes a business class of the business;

parsing the plurality of business context combinations into at least one category;

identifying service providers for the business based on the business class and one of the categories;

prioritizing the identified service providers; and providing information associated with the identified service providers to the business based on the prioritization of the identified service providers.

12. The computer program product of claim 11, the operations further comprising also identifying service providers for the business based on a locality of the business.

13. The computer program product of claim 11, the operations further comprising populating a service provider list with the identified service providers for communication to the business.

14. The computer program product of claim 13, the operations further comprising providing the service provider list via the business application.

15. The computer program product of claim 14, the operations further comprising populating the service provider list during deployment of the business application.

16. The computer program product of claim 11, the operations further comprising configuring the business application to permit a user of the business application to contact the service providers through the business application.

17. The computer program product of claim 11, the operations further comprising configuring the business application to permit a user of the business application to engage the service providers through the business application.

18. The computer program product of claim 11, wherein one of the business context combinations includes at least one of business information, demographic information, and information associated with a user of the business application.

19. The computer program product of claim 11, wherein the prioritization of the identified service providers is based on one of price, advertising deals, and expected delivery time.

20. The computer program product of claim 11, wherein the provided information includes contact information associated with the identified service providers.

* * * * *